United States Patent [19]

Shaw et al.

[11] Patent Number: 5,058,388
[45] Date of Patent: Oct. 22, 1991

[54] METHOD AND MEANS OF AIR CONDITIONING

[75] Inventors: Allan Shaw; Russell E. Luxton, both of 5th Floor, Security House, 233 North Terrace, Adelaide, State of South Australia, Australia

[73] Assignees: Allan Shaw; Russell Estcourt Luxton; Luminus Pty., Ltd., all of Australia

[21] Appl. No.: 573,233

[22] Filed: Aug. 27, 1990

[30] Foreign Application Priority Data

Aug. 30, 1989 [AU] Australia ............... PJ 6035

[51] Int. Cl.⁵ .............................................. F25D 17/06
[52] U.S. Cl. ...................................... 62/93; 62/176.6; 62/179
[58] Field of Search ................... 62/93, 176.6, 179

[56] References Cited

U.S. PATENT DOCUMENTS

| | | | |
|---|---|---|---|
| 4,319,461 | 3/1982 | Shaw | 62/93 |
| 4,841,733 | 6/1989 | Dussault | 62/93 |
| 4,942,740 | 7/1990 | Shaw et al. | 62/93 |

FOREIGN PATENT DOCUMENTS

| | | |
|---|---|---|
| 530554 | 3/1979 | Australia. |
| 597757 | 5/1988 | Australia. |

OTHER PUBLICATIONS

ASHRAE Fundamentals Handbook, Ch. 8, pp. 8.1–8.32, (1989).
ASHRAE Standard 55-1981—Thermal Environment Conditions for Human Occupancy, pp. 1–17, (1981).
ASHRAE Fundamentals, 1985, Ch. 8, pp. 8.1–8.32, (1985).
B. W. Olesen, Thermal Comfort, Bruel & Kjaer, Technical Review, No. 2, pp. 1–43, (1982).

Primary Examiner—William E. Wayner
Attorney, Agent, or Firm—Baker, Maxham, Jester & Meador

[57] ABSTRACT

An air conditioned space is cooled within a narrow target zone (as depicted on a psychrometric type chart) within which human occupants of the conditioned space would feel thermally comfortable, wherein factors including the heat transfer resistance of occupants' clothing and level of physical activity determine the target zone, by a method which includes correction of operative temperature, relative air velocity and humidity within the conditioned space, inherently controlling humidity by control of effective dehumidifier size while maintaining a low face velocity of air and a high velocity of coolant flow, but varying either, or both, dehumidifier size and the leaving air temperature if humidity ratio falls below four or exceeds thirteen grams of water per kilogram of dry air.

25 Claims, 9 Drawing Sheets

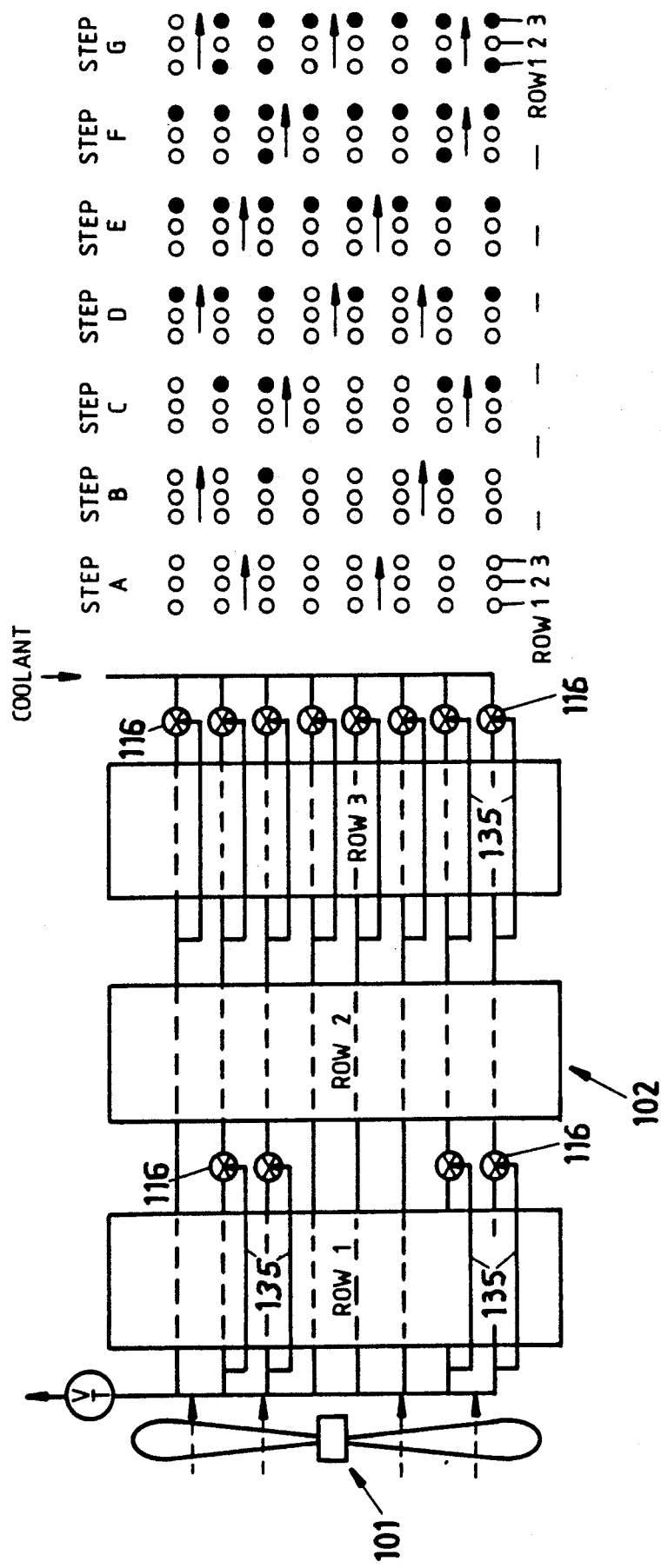

METHOD AND MEANS OF AIR CONDITIONING

This invention relates to a method of air conditioning and a means of controlling an air conditioner in such manner as to achieve thermal conditions which closely approximate those recommended by the ASHRAE Standard on Thermal Environmental Conditions for Human Occupancy, or other similar standards based on the "comfort equation", over a broad range of operating conditions.

BACKGROUND OF THE INVENTION

The ASHRAE Standard 55-1981 entitled "Thermal Environment Conditions for Human Occupancy" sets out the following parameters which require design attention:

Operative Temperature (typical ranges for a building in which occupants are mostly sedentary depend on humidity but span approximately 3.5° C. within the global ranges, summer 22° C.-27° C., winter 20° C.-23° C.)

Humidity (4.2-12 g/kg moisture ratio)

Air movement (summer not exceeding 0.25 m/sec.), (winter not exceeding 0.15 m/sec.)

Mean radiant temperature (operative temperature normally being an average of air temperature and mean radiant temperature)

Thermal resistance of clothing

Occupants' average metabolic rate (having regard to activity level).

A revision of this Standard, designated AINSI/ASHRAE Standard 55-81R has been released for public review and proposes tighter limits by specifying that the relative humidity should lie between 60% and 30% and narrowing the temperature range by approximately 0.5° C.

This invention addresses all the above parameters, and, in addition, addresses the ventilation requirements which require a minimum air velocity through air distribution registers for proper diffusion of the supply air. It does not directly address other parameters listed in the Standard, such as non-steady and non-uniform temperature, radiant asymmetry and floor temperatures. It does, however, provide a means and method whereby operative temperature and the insulating effect of most people's clothing may be estimated, and whereby a conditioned space may be retained within that portion of the "comfort zone", illustrated for a specific example situation in the psychrometric chart on page 5 of the ASHRAE Standard, necessary to ensure also that the relative air velocity requirements, illustrated for example in FIG. 17 of Chapter 8 of ASHRAE Fundamentals 1985, are satisfied at all times.

The ability to vary the volume of the conditioned air supply to offset the sensible load in individual zones often causes the Variable Air Volume (VAV) system to be preferred to the Constant Air Volume (CAV) system, in which variations in sensible load are accommodated by changing the conditioned supply air temperature but maintaining its volume flow. Both systems suffer from imperfections and these become manifest as the load sensed by the control system reduces, that is, as the sensible load reduces. In VAV systems often the volume of ventilation air delivered to the minimum load zone is insufficient to avoid stuffiness; lack of air motion accentuates the sense of discomfort and dissatisfaction felt by the occupants. Also the humidity of the air can rise to unacceptable levels at part load. The CAV system avoids the stuffy, stagnant air complaints but frequently results in even less acceptable levels of humidity.

The invention is applicable to both existing and new VAV or CAV systems.

Reference can be made to Australian patents 530554 and 597757, and U.S. Pat. No. 4942740. These patents relate to some of a series of inventions for which patents have been granted are pending and which trace the development of several methods of air conditioning which when combined become the method known as the low face velocity/high coolant velocity (LFV/HCV) method. This invention embodies features of said patents, and relates to a means and method whereby the thermal conditions for human comfort can be yet more closely achieved, which is the principal purpose of this particular invention. As indicated above the method may be used with both constant air volume (CAV) and variable air volume (VAV) systems and is compatible with all conventionally employed coolants. To a limited degree the present method can be made compatible with conventional systems which are unrelated to the earlier inventions by the proponents but is most readily effected in conjunction with the invention of said patent 597757 and U.S. Pat. No. 4942740.

Physically based empirical equations have been developed to describe the thermal equilibrium between a human subject and the surroundings. The effects of each of the parameters discussed above on the rate of heat loss from the human subject are combined in an equation known as "the comfort equation". This long equation and its physical and empirical bases are succinctly summarized by B. W. Olesen in an article entitled "Thermal Comfort", Bruel & Kjaer Technical Review No. 2, 1982, and in more detail in standard texts. The physically based "comfort equation" allows the quantitative estimation of the various heat gains and losses by the subject but does not indicate the reaction of the subject to those gains and losses. Thermal comfort is defined as "that condition of mind in which satisfaction is expressed with the thermal environment". By testing the reactions of many hundreds of subjects to defined conditions within fully instrumented environmental test chambers, Professor P. O. Fanger of the Technical University of Denmark determined the most probable reactions of subjects and correlated these with the various effects on heat gains and losses embodied in the "comfort equation". This he did in a manner which allows the most probable "predicted mean vote" (PMV) of persons to their thermal environment to be deduced through solution of the "comfort equation". Fanger's results are compatible with those of professor A. P. Gagge and others in the United States of America and have been verified and extended by researchers in many other countries. These results have been drawn together to form the basis for the ASHRAE Standard 55-81 on thermal environmental conditions for human occupancy. This Standard is advisory. It indicates the thermal conditions for which designers should aim in order to ensure that the majority of occupants feel thermally comfortable, i.e. not too hot, not too cold, not too moist, not too dry.

It is important to note that human comfort involves factors other than thermal comfort. Lighting level and colour, noise level and spectrum, posture, odour, touch, disturbance by breeze and by other persons can, if unacceptable, cause discomfort so nullifying attempts to satisfy conditions for thermal comfort to which the present invention specifically relates.

Numerous tables and charts have been constructed from the "comfort equation". No one single table or chart is sufficient to cover fully the influence of all the above listed variables. Nevertheless the major factors influencing human comfort are revealed by an examination of several of these charts. The aforesaid article by B. W. Olesen indicates that to illustrate all aspects of the "comfort equation" requires twenty eight different charts or diagrams.

The comfort equation expresses the energy balance between a person and their surroundings assuming that steady state equilibrium has been established. Using the notation of ASHRAE Fundamentals Handbook (1989) the total rate of energy output by the person in a steady state situation is equal to the metabolic rate. Some of this energy may be expended in performing mechanical work such as lifting a weight, as when walking up stairs, but the remainder appears as heat which must be lost to the surroundings if the person's basal temperature is to remain constant without the body invoking the thermoregulatory reactions of heavy sweating if too hot or shivering (to increase metabolic rate) if too cold. Thus the net rate of heat loss from the person per unit of skin surface area is (M-W) Watts per square meter.

The mechanisms by which the heat is lost are by transfer through the skin, $Q_{sk}$, and by transfer through the lungs, that is by respiration, $Q_{res}$.

The loss from the skin can be subdivided into a loss of sensible heat by convection, C, and by radiation, R, and a loss of latent heat through evaporation of moisture from the skin, $E_{sk}$.

The loss by respiration is substantial. It can be divided into a convective loss $C_{res}$ and an evaporative loss $E_{res}$.

All quantities are expressed in units of Watts per square meter of skin surface. When a "standard" body surface area, known as the "Dubois surface area", is specified the metabolic rate may, for ease of comparison, be expressed in the "met" unit where 1 met=58.2 W/m² = 50 Kcal/(h.m²) is the metabolic rate of a healthy adult person when seated quietly.

For a nude subject the surface area of skin can be determined and the skin temperature measured at representative points. Furthermore the heat transfer coefficients for convection and radiation, hence the sensible heat exchange with the surroundings, and the rate of evaporation of moisture from the skin can be determined. Similarly the sensible heat and the moisture losses from the lungs can be obtained from empirical equations deduced by Professor Fanger. Thus, all parameters of the comfort equation may be determined for the nude subject.

The effect of clothing is to add a layer of insulation to parts of the body. This insulation may be described as if it is a single equivalent uniform layer over the whole body. The insulating value is expressed in the units of "clo" where 1 clo=0.155 m². °C/W. The clothing also changes the surface area through which heat and moisture are exchanged with the surroundings and hence a small correction must be made to the Dubois surface area. The clo values for a wide range of garments from underwear to fur top coats have been tabulated in various reference books and are summarised in the aforesaid ASHRAE Standard.

Taking all factors into account P. O. Fanger in his book "Thermal Comfort", published in the readily available edition in 1982 by Krieger Publishing Company, Florida, developed the single equation which is the equation now most frequently referred to as "the comfort equation". The equation is written in the form given below. In the present invention ideally it is solved as an algorithm within the control system or, in the simplest realization, its solution is estimated from tabulated data for later combination with other data to set manually a zone thermostat.

The Fanger comfort equation is $$(M - W) = 3.96 \times 10^{-8} f_{cl} [(t_{cl} + 273)^4 - (E_r + 273)^4] -$$

$$f_{cl} h_c (t_{cl} - t_a) + 3.05[5.73 - 0.007(M - W) - p_a] +$$

$$0.42[(M - W) - 58.15] + 0.0173 M(5.87 - p_a) +$$

$$0.0014 M(34 - t_a)$$

where $t_{cl} = 35.7 - 0.0275 (M - W) - k I_{cl} [(M - W) -$ $$3.05[5.73 - 0.007(M - W) - p_a] - 0.42[(M - W) - 58.15] -$$

$$0.0173 M(5.87 - p_a) - 0.0014 M(34 - t_a)]$$

and M=Metabolic energy production rate, W/m²
W=External work, W/m²
$f_{cl}$=Ratio of surface area of clothed body to that of nude body
$t_{cl}$=Temperature of surface of clothing, °C.
$E_r$=mean radiant temperature received by subject, °C.
$h_c$=convective heat transfer coefficient W/m²K.
$t_a$=air temperature in conditioned space, °C.
$p_a$=partial pressure of water vapour in air, kPa
k=0.155m². °C./(clo.W)=a unit conversion
$I_{cl}$=intrinsic clothing insulation.
The values of $h_c$ and $f_{cl}$ are given by $$h_c = \begin{cases} 2.38 (t_{cl} - t_a)^{0.25} & \text{for } 2.38 (t_{cl} - t_a)^{0.25} > 12.1 \sqrt{V} \\ 12.1 \sqrt{V} & \text{for } 2.38 (t_{cl} - t_a)^{0.25} < 12.1 \sqrt{V} \end{cases}$$

$$f_{cl} = \begin{cases} 1.00 + 0.2 I_{cl} & \text{for } I_{cl} < 0.5 \text{ clo} \\ 1.05 + 0.1 I_{cl} & \text{for } I_{cl} > 0.5 \text{ clo} \end{cases}$$

where V=relative velocity of air, m/s.

The difference between the left hand and right hand sides comfort equation is the thermal load on the body. The thermal load L is defined in ASHRAE 1989 Fundamentals Handbook as the difference between the internal heat production and the heat loss to the actual environment for a person hypothetically kept at comfortable skin temperatures and thermoregulatory sweat secretion rate for the actual activity level.

Fanger devised a voting scale for comfort and means of determining the predicted mean vote (PMV) of a large group of subjects for a given environment. The scale is

| | |
|---|---|
| +3 | hot |
| +2 | warm |
| +1 | slightly warm |
| 0 | neutral |
| −1 | slightly cool |
| −2 | cool |
| −3 | cold |

The predicted mean vote was found to be fitted closely by the equation $$PMV = [0.303 \exp(-0.036 M) + 0.028]L$$

where the thermal load L is determined from the comfort equation as indicated above.

The percentage of people dissatisfied with a given thermal environment may be related to the predicted mean vote and it has been found that not more than 10 percent of occupants will be dissatisfied, that is 90 percent will be satisfied, if $$-0.5 \leq PMV \leq +0.5.$$

These limits define the range of conditions within which the thermal environment is controlled according to the present invention. It may be noted that even for a predicted mean vote of zero, five percent of the occupants are likely to be dissatisfied.

It must be stressed that this is one only of the criteria available for determining acceptable thermal environmental conditions. We seek here to establish the method of achievement of human thermal comfort rather than the specific criteria used to measure that thermal comfort.

While most designers are successful in satisfying the thermal comfort criteria at peak load conditions, few if any have been able also to satisfy the criteria at all operating loads without resorting to the costly practice of overcooling and then reheating the air. This lack of success has caused many designers to ignore the recommendations of the aforesaid Standard. This in turn has contributed to the development of the "sick building syndrome". The problem stems from a fundamental incompatibility between the recommendations of the Standard and the means by which conventional air conditioning systems are controlled.

It is the aim of this invention to remove this incompatibility to allow the requirements for the thermal comfort of occupants to be satisfied at all conditions of operation of the air conditioning system. To do this the broad comfort zone depicted on the aforesaid ASHRAE psychrometric chart must be subdivided into a series of narrower bands each providing the "target" for operation over its own range of operating load conditions and occupant related characteristics.

The narrow "target zones" must embrace the wide range of clothing worn by occupants of an air conditioned space during the operating year, the diverse ranges of activity by the occupants varying from sedentary (met=1) to very active (met=3), and the need to consider relative air velocity (velocity of air over occupants of a conditioned space), air dry bulb temperature, radiant temperature and operative temperature, volume flow rate of air, sensible and total heat load, and humidity ratio. If these matters are considered, the level of human comfort now deemed desirable can be achieved only by adjusting from one narrow target zone to another such that effectively a narrow "moving comfort target zone" is defined within the relatively broad ASHRAE Standard comfort zone. This moving target zone will occupy different positions on a psychrometric, or psychrometric type, chart as both occupant related and system related conditions change during the operating year.

However, the Applicants herein have ascertained that under most climatic conditions the LFV/HCV air conditioning system, the subject of aforesaid U.S. Patent 4942740, can inherently restrain humidity in the occupied space from rising above the limit recommended by the aforesaid Standard. Control of relative air velocity, supply air dry bulb temperature and dehumidifier size can, in this invention, achieve a design condition within the required very narrow target zone within the general comfort zone. The location of the target zone itself may be "moved" on a psychrometric chart, manually or automatically (or a combination of both), by changing control set points to accommodate changes in occupant clothing or activity, changes in the level of direct solar or other thermal radiation and changes in ambient conditions. Provided the building design avoids excessive direct solar input through windows, diurnal adjustment is rarely required.

BRIEF SUMMARY OF THE INVENTION

In this invention, an air conditioned space is cooled within a narrow comfort target zone (as depicted on a psychrometric type chart), wherein factors including the heat transfer resistance of occupants, clothing and level of physical activity determine the target zone, by a method which includes mutual and sympathetic correction of operative temperature, relative air velocity and humidity within the conditioned space, inherently controlling humidity by control of effective dehumidifier size while maintaining a low face velocity of air and a high velocity of coolant flow, but increasing either, or both, dehumidifier size and surface temperature if humidity ratio falls below four point two grams of water per kilogram of dry air.

Desirably, an electronic controller is employed which either directly or indirectly indicates to the means controlling the flow of supply air and to an Air Handling Unit controller the change in the requirements for the target zone so they may adjust appropriately. The difference between the ambient air enthalpy and that in the conditioned space may also be sensed conventionally where economy cycle operation is required.

The preset parameters include adjustment for clothing and occupant activity, and in some instances for air flow velocity. Obviously there is considerable advantage in using the proponent's aforesaid invention the subject of said patents, especially in association with variable air volume since the increased dehumidification available at peak load due to reduction of the air flow velocity through the dehumidifier coil of the Air Handling Unit greatly widens the range of simultaneous loads in different zones which can be accommodated; but as set out hereunder, a CAV system can also utilise this invention with considerable advantage if differences between the requirements of different rooms are not large, and/or if the CAV system allows stepwise changes of air flow volume.

BRIEF SUMMARY OF THE DRAWINGS

An embodiment of the invention is described hereunder in some detail with reference to the accompanying drawings, in which:

FIG. 7 is a diagrammatic representation of a dehumidifier, illustrating seven coil configurations which progressively reduce the effective size of the dehumidifier, to provide a series of steps so to retain high coolant velocity as heat load reduces.

BRIEF DESCRIPTION OF THE PREFERRED EMBODIMENT

Figure 1:
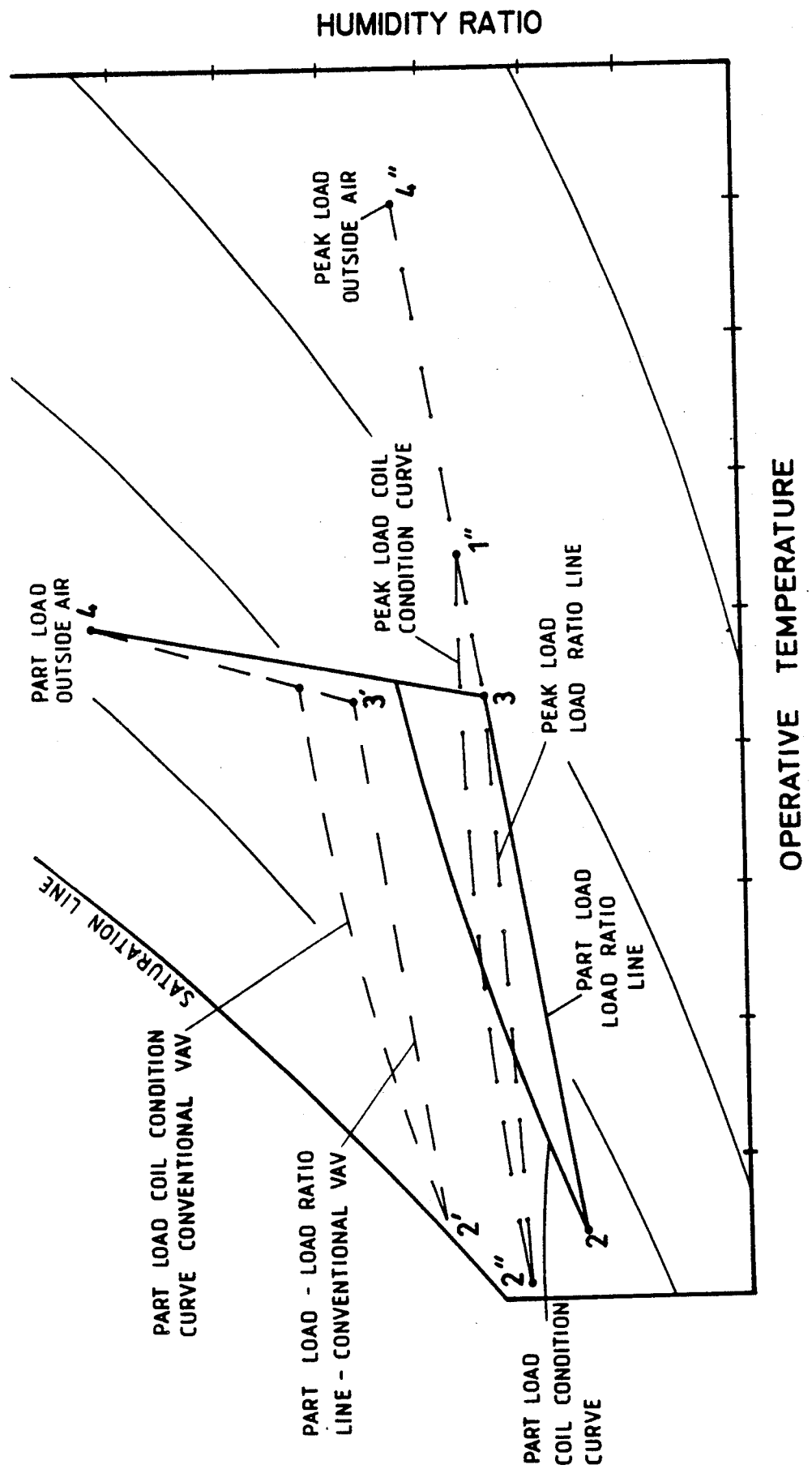
FIG. 1 is a psychrometric chart on which is shown the comparative performances of a conventional VAV system and the integrated system of this invention.

FIG. 1 (full lines) is a psychrometric representation of this invention compared with that for a conventional VAV system (dashed lines).

As described in the specification of the LFV-HCV U.S. Pat. No. 49112740, the equilibrium room condition of a conventional VAV system, 3', is at a higher room humidity ratio than that for the LFV-HCV room condition, 3. As indicated in this example the equilibrium condition for the conventional system may rise to a moisture level which lies outside and above the area of acceptable comfort.

Although the LFV-HCV room condition, point 3, lies within the area of acceptable comfort, more critical examination indicates that conditions in the room may not necessarily be comfortable. The prime criterion of ASHRAE Standard 55-1981 is that at least 80 percent of the occupants will feel thermally comfortable. As indicated in the previous section many factors influence this judgement or "condition of mind". It is a misconception to assume that the "comfort zone" indicated in that Standard is a sufficient requirement. Even that comfort area is only a graphical example in which the mean radiant temperature is assumed to be equal to the air dry bulb temperature. There is in fact a much smaller zone than that indicated in FIG. 1 which defines conditions which are both necessary and sufficient to satisfy the prime criterion of thermal comfort. This zone is determined by the other variables indicated earlier.

The most accurate means presently available to determine optimum human comfort conditions is by use of the empirical equations from which most of the published charts are derived. This is the preferred method, though this invention does not depend on the specific method used provided it satisfies the acceptability criteria for human comfort. Charts of restricted applicability which have been constructed from these equations will be employed in order to simplify the description of the invention.

Figure 2:
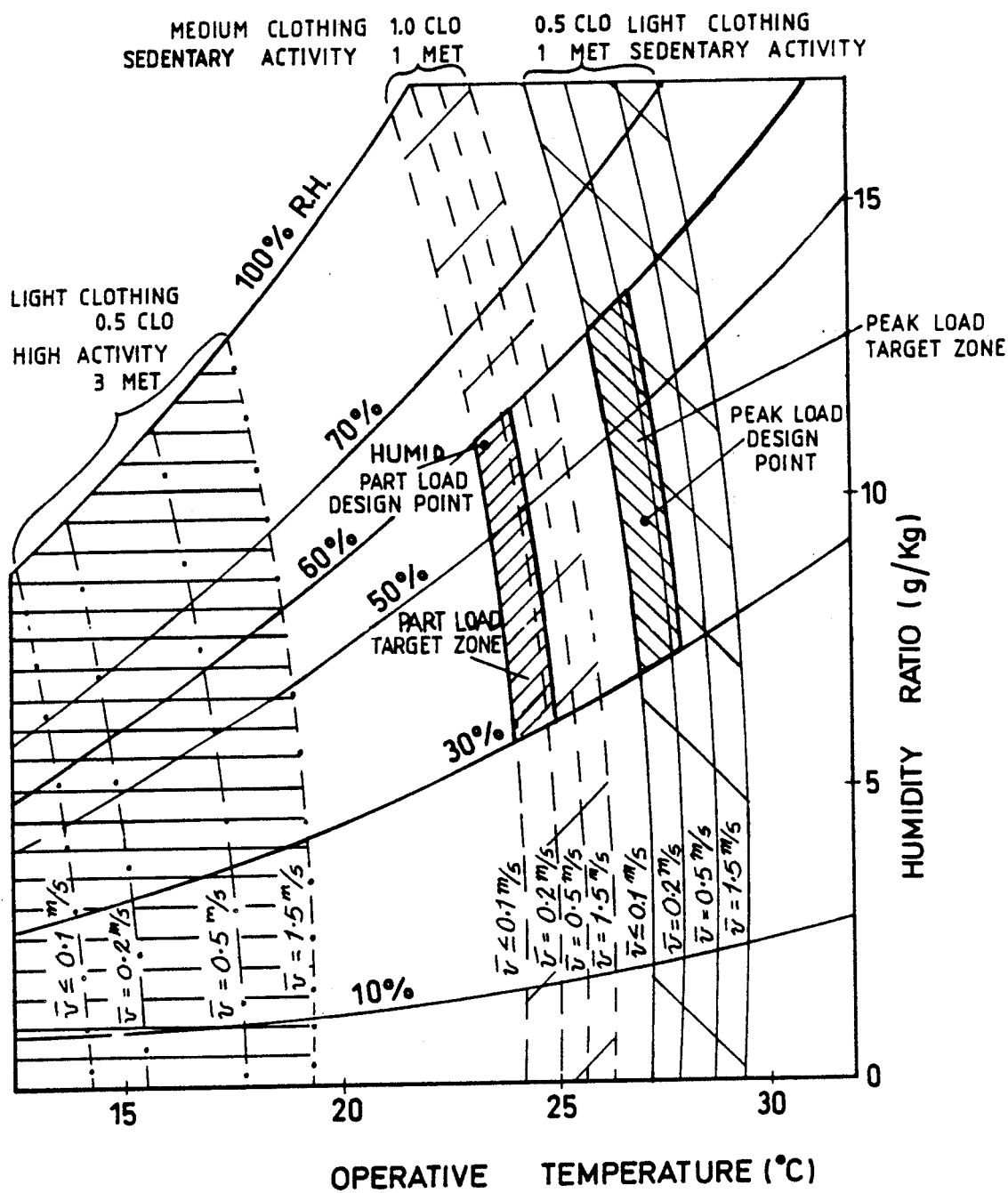
FIG. 2 is a psychrometric type chart which illustrates the effect of light clothing (0.5 clo) and intermediate clothing (1.0 clo) on the location of a target zone for sedentary occupation, and also the effect of high activity level, on the sensation of operative temperature by a human subject for a range of relative air velocities between less than or equal to 0.1 meters per second and up to 1.5 meters per second.

FIG. 2 indicates the importance of relative air motion and level of activity. Three bands each traversed by four curves are presented. The first band and set of four curves on the right hand side (full lines) represent thermal comfort conditions for clothing values 0.5 clo respectively for relative air velocities of 1.5 m/s, 0.5 m/s, 0.2 m/s and less than or equal to 0.10 m/s, and mainly sedentary activity typical of that in an office building for which the metabolic rate is 1 met. The second band and set of four curves (dashed lines) represent comfort conditions, also for medium clothing (1.0 clo) when sedentary (1 met), while the left hand band and set of chain dashed lines represent comfort conditions for high activity (3 met) and light clothing (0.5 clo). The "target zone" within the right hand band is for temperatures about 26° C., clothing 0.5 clo, relative velocity between $\leq 0.1$ m/s and 0.25 m/s and relative humidity between 30% and 60%. At relative velocities above 0.25 m/s, although occupants may feel thermally comfortable, they find the direct effects of the relative velocity disturbing.

The curves indicate the large influences of activity and attire on the required operative temperature. For example, on a marginal day for a given relative velocity, equal satisfaction is felt by sedentary subjects wearing medium clothing (1.0 clo) in an operative temperature of 24° C. and by lightly attired (0.5 clo) subjects performing high activity in an operative temperature of 14° C. Similarly on a hot summer day (right hand and left hand sets of curves which assume that occupants are attired in light clothing) 26° C., 19° C. and 14° C. are all equally comfortable operative temperature conditions sedentary (26° C.) and for high activity respectively, where 19° C. relates to a very high air velocity (1.5 m/s) and 14° C. relates to air velocity $\leq 0.1$ m/s. (The 1.5 m/s figure greatly exceeds ASHRAE recommendations but is shown to illustrate the effect of velocity).

On all the charts air velocity variations narrow the available area of optimum comfort. The authoritative ASHRAE Standard ASHRAE 55-1981 specifies:

"Summer: the average air movement in the occupied zone shall not exceed 0.25 m/s."

"Winter: the average air movement in the occupied zone shall not exceed 0.15 m/s."

Note that the maximum time-average air movement allowed in the occupied zone is lower in winter than in summer. It is also indicated in the ASHRAE Standard that if temperature and humidity are acceptable there is no minimum air movement that is necessary for thermal comfort.

In normal air conditioning practice it is unlikely that zone temperatures higher than 26° C. in the summer would be considered comfortable. However comfort within the Standard allows the temperature to increase to 28° C. if accompanied by an increase in air movement of 0.275 m/s for each degree C. increase in zone temperature. In this instance the increase in air movement increases the rate of heat transfer from occupants to compensate for the higher temperature air in the room so maintaining comfortable skin temperatures and skin wettedness.

To put into perspective the maximum relative velocities for winter and for summer the ASHRAE 55-1981 Standard states, "Loose paper, hair and other light objects may start to be blown about at air movements of 0.8 m/s (160 fpm)."

The above considerations underline the importance in air conditioning system design of ensuring that supply air and diffusers are so placed and designed to deliver air to the room in such manner that the relative velocities in the vicinity of the occupants lie within the range specified by the ASHRAE 55-1981 Design Standard, or its equivalent. This invention assumes this is achieved by using best practice design methods in designing the air distribution system for peak load operation and that the relative velocity at any given point in the room is proportional to the volume flow rate of air to the room. By reducing the range of volume flow rate variation between peak and minimum part load, the invention itself contributes to the satisfaction of this assumption.

Most of the data reported in the literature on comfort conditions relate to low air movements. For example Table 1 of Standard 55-1981 reports "operative temperature range for 80% thermal acceptability is based on an air movement of 0.15 m/s". FIG. 1 of the Standard, in which clothing insulation is plotted as a function of operative temperature for sedentary activity at 50% relative humidity, is also based on a relative velocity of ≦0.15 m/s.

To evaluate the extent to which existing air conditioning systems adhere to human comfort principles, the design performance of an actual variable air volume (VAV) system designed for a high-rise office building in a temperate climate on the western seaboard of Australia is considered. Many types of air conditioning systems could be employed. The superior performance of the LFV-HCV system in maintaining sensible temperatures and humidity ratios which are always within the area of comfort shown in FIG. 1 has already been established, and proven in practice. The performance of this already superior low energy multizone LFV-HCV system is now contrasted with a system which incorporates the comfort integration of the present invention into the design.

Before proceeding with the comparison, a brief outline of the LFV-HCV-VAV multizone system is presented.

The following aspects of the conventional VAV system are retained in the LFV-HCV method:

A constant supply air temperature is maintained, the coolant flow rate is controlled to maintain the constancy of the supply air temperature, each zone has a thermostat which controls the damper settings to maintain the zone dry bulb temperature, the fan volume flow rate is regulated by one of a number of conventional methods to be compatible with the combined effect of the damper settings in the various zones.

However the LFV-HCV method is different from the conventional VAV system in that:

the system operates at a substantially lower face velocity, the coolant velocity is higher, particularly at part load conditions during which the active size of the dehumidifier is reduced, the fin density, circuiting and coolant temperature are important design factors in optimization of performance over the full operating range, the system has a greater capacity to accommodate simultaneous multizone range variation, and the system uses less energy.

Figure 4:
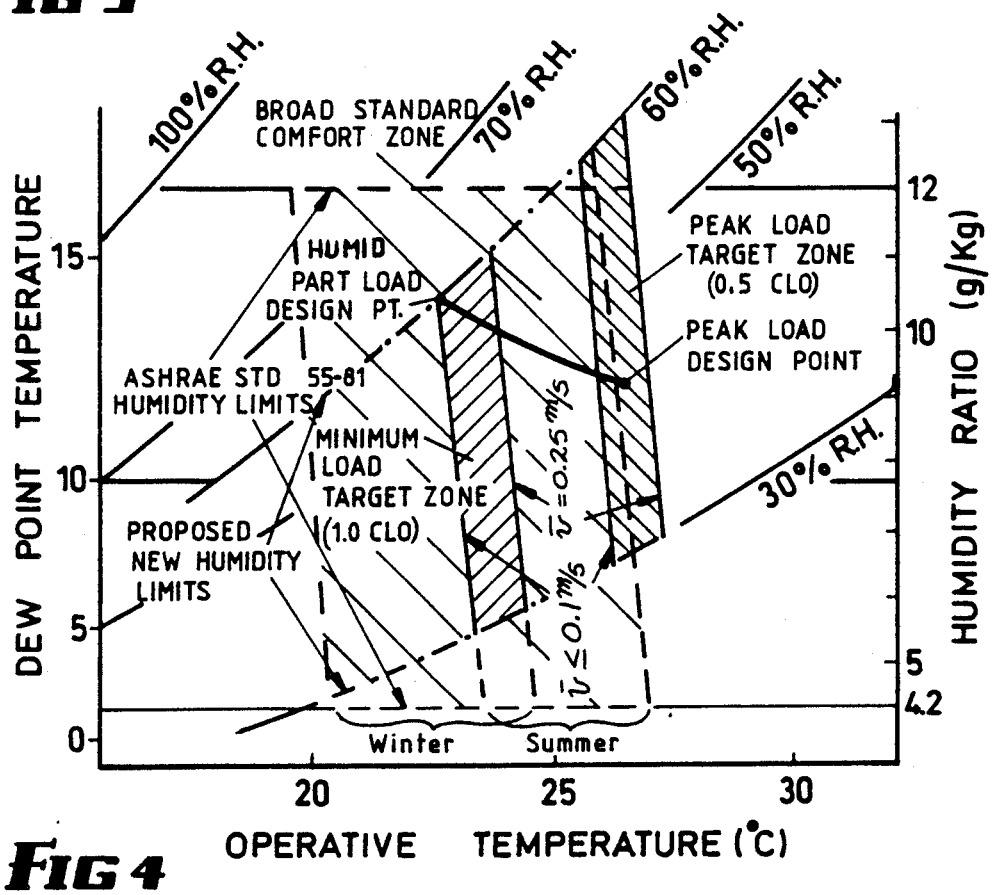
FIG. 4 is a portion of a psychrometric chart which shows schematically movement of relative velocity lines with operative temperatures between peak and minimum load conditions as the typical clothing of occupants varies during the cooling year. Also shown are the broad standard comfort zone and the revision of the upper and lower limits for humidity proposed by ASHRAE, FIGS. 5A and 5B indicate the influence of relative velocity without and with the present comfort integration of this invention. The operative temperature scales on the abscissae have been aligned for clarity.

The following is the method which would be used in an LFV-HCV system using VAV and in accordance with our aforesaid patents for an installation suitable for the example office:

A coil is selected to satisfy the design requirements of an air handling unit to supply a number of zones on a typical level of a high-rise office building located in a temperate climate. A room summer dry bulb temperature of 24° C. is considered good design when coupled with a system which maintains humidity safely within the comfort areas shown in FIG. 4 (see for example FIG. 1). In FIG. 4, the standard broad comfort zone is shown in dashed lines and is cross-hatched. Apart from this and following best practice in the design of the air distribution system, no special regard is given to human comfort principles.

At peak load the selection provides a room condition of 24° C. and 48 percent relative humidity, and offsets the room sensible heat ratio of 0.87 for the local climatic design condition.

At 65 percent of the room sensible load the selection provides a room condition of 24° C. and 57 percent relative humidity and offsets the room sensible heat ratio of 0.67 for a mild but humid part-load design condition, hereinafter called the humid part-load design condition.

Figure 5A:
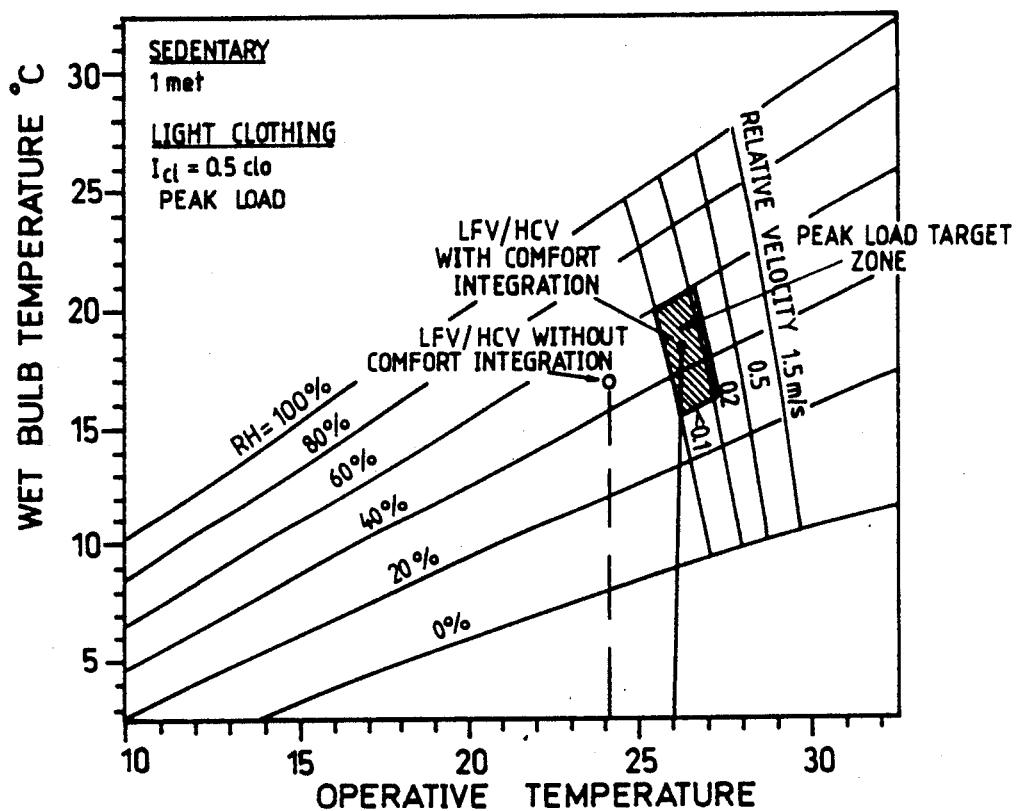
Figure 5B:
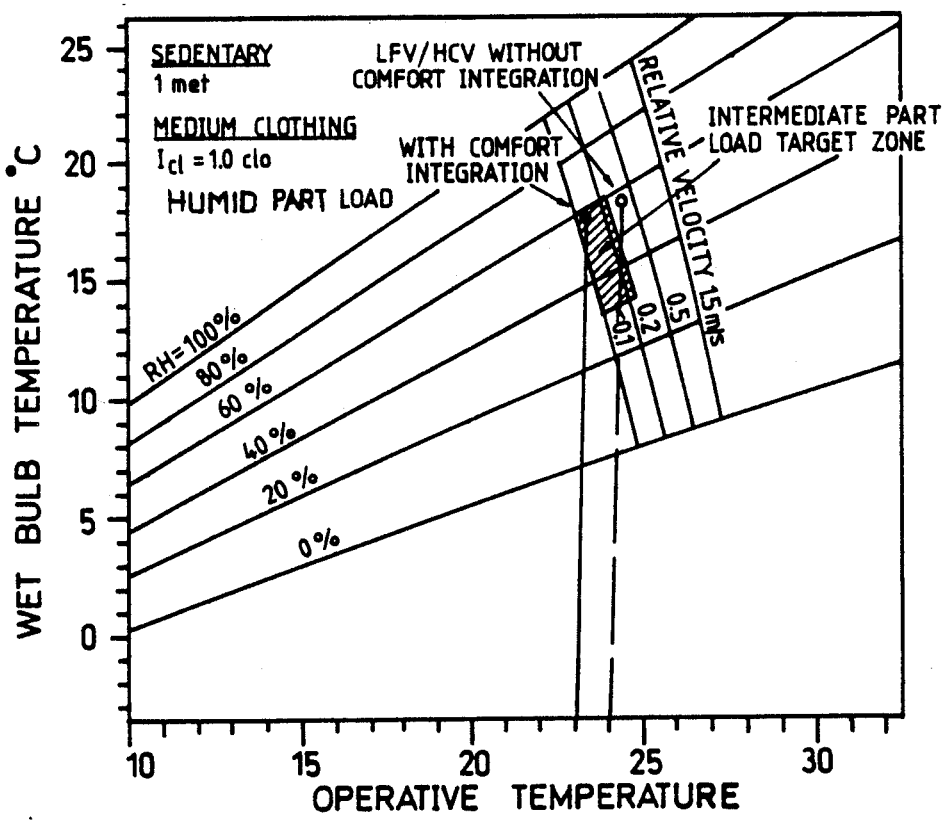

During peak load conditions the building occupants will mostly be wearing light clothing. Thus the chart of FIG. 5A is the appropriate figure on which to indicate by an open circle the performance of the LFV-HCV system for peak conditions, without comfort integration. During humid part-load conditions, which occur most frequently during the Autumn, typical clothing will be a little heavier and the chart of FIG. 5B is applicable. The part load condition without comfort integration is again indicated by an open circle.

First, with reference to the peak load performance, at 24° C., 48% RH, the room condition lies significantly below the relative velocity for comfort marked "less than 0.1 m/s". Thus, for 80% of occupants to be comfortable the air flow velocity must be less than 0.1 m/s. The fact that it appears that it must be significantly less than 0.1 m/s is not important as there is no minimum air movement specified as being necessary for thermal comfort if the operative temperature and humidity are satisfactory. Thus, if the air distribution system can achieve this low velocity, the performance is within the "acceptable" range.

The room condition achieved falls safely within the comfort zone of FIG. 4. However it is unlikely to be possible both to offset the peak load and to satisfy ventilation requirements without higher air velocities. The designer may be tempted to increase the supply air temperature and increase air volume at the expense of a higher fan cost. However this would aggravate the problem of increasing humidity in the conditioned space during humid part load operation. Thus this option should be rejected. Unless the ceiling is many meters above the floor it would be difficult to introduce the required volume flow of air while maintaining the low relative velocity demanded of the peak load design. Furthermore, during part load operation this air movement would be further decreased in a VAV system. Thus 24° C. is not a practical room dry bulb temperature for peak load operation. Even though it would at first sight appear that the human comfort conditions, as represented by the "comfort zone" depicted in FIG. 3, could be met, in practical terms the thermal loads and statutory ventilation requirements would be difficult to meet while also satisfying the low levels of air movement required for comfort at peak load and would lead to stagnant conditions at part load. The required minimum standard of ventilation is 7.5 liters per second per person.

Reference is now made to the room condition of 24° C., 57% RH achieved during humid part-load operation: This is made thermodynamically compatible with the peak selection by reducing the active area of the dehumidifier coil and increasing the coolant flow velocity through the remaining active portions, according to the LFV/HCV invention, to offset both sensible and latent loads at the lower room sensible heat ratio of 0.67, a commonly occurring ratio for part-load conditions. But the relative velocity required for comfort at the design room condition (FIGS. 5A and 5B) is greater than 0.4 m/s which is well above the maximum relative velocity recommended in the ASHRAE Standard. It is also incompatible with the peak load condition in that less air is supplied to the room but air motion is required to be many times greater. Thus at part-load the system, though it properly offsets the sensible and latent heat loads in their correct ratio while maintaining a comfortable humidity ratio in the room, fails to maintain an acceptable relative velocity. Had the system been a conventional VAV system, without the LFV-HCV improvements, the relative velocity required for comfort would be even greater to compensate for the higher humidity indicated by room condition 3' in FIG. 1.

The air distribution system is identical for both peak and humid part load operation, the latter of which requires only 65 percent of the air flow volume required by the former. Thus it would be impossible to provide the performances indicated on FIG. 5A as being required for comfort at both peak and humid, or indeed any other part load conditions. The air required to offset part loads could not possibly be delivered through the same supply air system in a way which results in a higher relative velocity than that at peak load.

Although the above example is a particular application, the result is typical of present best-practice. As can be seen, either directly or indirectly, this best-practice is incompatible with the ASHRAE 55-1981 Standard for Thermal Environmental Conditions for Human Occupancy, with the principles of human comfort presented in Chapter 8 of ASHRAE 1985 Fundamentals, and with the work of P. O. Fanger of the Laboratory of Heating and Air Conditioning at the Technical University of Denmark, inter alia.

An examination of the charts of FIGS. 5A and 5B clearly indicates that the operative temperature in the air conditioned space should not be constrained to a constant value, but should be allowed to vary as a function of the particular room loads of the moment and the clothing appropriate to the season. In the above example in which the room temperature of 24° C. was prescribed, it becomes clear that at peak loads this dry bulb temperature is too low and at part loads is too high for comfort to be achieved in a practical design.

The above analysis indicates that there is no logical means by which one could satisfy comfort standards while maintaining a fixed room dry bulb temperature in all the zones In the cited example it was found to be impossible to maintain a relative velocity which satisfied the ASHRAE Comfort Standard. This conclusion must be qualified as it depends on the level of confidence in the FIG. 5 charts. To prepare these charts the dimensionality of the problem has been reduced by assuming that the air temperature equals the mean radiant temperature. The ASHRAE "area of comfort" (FIG. 4), on the other hand, is in terms of the "operative temperature". The "operative temperature" is defined in Paragraph 3.9 of ASHRAE Standard 55-1981 for the thermal environmental range for human comfort as "approximately the simple average of the air and mean radiant temperatures". Naturally, if the air temperature does equal the mean radiant temperature, as in an interior zone with low temperature lighting, this definition would be satisfied. Since often they will not be equal, the conclusions drawn from the use of FIGS. 5A and 5B can only be regarded as qualitative. More detailed analysis based on the use of the full "comfort equation", from which the simplifications embodied in FIGS. 4 and 5 are also distilled, show that these qualitative conclusions are nevertheless indicative of practical situations in which the mean radiant temperature differs from the dry bulb temperature, as would be found in most perimeter zones.

The chart values used in FIG. 4, even with the use of "operative temperature" as abscissa, deviate from the actual values derived from the full comfort equation when the insulation value of the clothing in the area designated "summer" differs from 0.5 clo. A correction factor of −0.6° C. per 0.1 clo is recommended in ASHRAE 55-1981. Thus for the marginal 65% part load condition of 24° C. used in the example design, the operative temperature for a change from 0.5 clo to 0.9 clo would, under the conditions of FIG. 4 and FIG. 5 (where it is assumed that air temperature is equal to mean radiant temperature) require a shift of the comfort areas to the left by 2.4° C.

Clearly this points to a preference in the application of this invention for a control system which senses the true values and then employs the basic equations rather than using chart values. In this manner both seasonal and diurnal variations in the various rooms or zones can be accommodated.

Adherence to human comfort principles will thus be seen to require changes in design of air conditioning systems and equipment. The necessary changes in method, design methodology and equipment selection are addressed by the present invention.

By way of contrast, the following sets forth requirements for this invention:

In the analysis above it has been indicated that human comfort principles are not adequately addressed by existing air conditioning systems. These systems have not been designed to satisfy human comfort though many designers may have been under the misconception that, by maintaining room conditions within the bounds of the area marked on FIG. 4, comfort would be assured. These findings may go a long way to explaining the occupant dissatisfaction which has been the subject of both technical papers and Open Forum debates within the learned societies.

It is the purpose of this invention to present a new method of air conditioning in which human comfort and proper air treatment may be integrated; that is, to present a method and system within which the air treatment is achieved by means which are compatible with all other requirements for thermal comfort at all times. The presentation of this method will continue to use as a vehicle the LFV-HCV-VAV system of U.S. Pat. No. 4942740. However as indicated above the method of this invention can also be extended, with modification, to the design of other types of air conditioning systems.

To demonstrate the invention and its numerous benefits, the performance of the LFV-HCV-VAV design with comfort integration will be determined for the same thermal design specifications as for the already superior system analysed above. It will enable a fair comparison of the new system and existing best-practice, and will support the assertion that, in this invention, human comfort principles can be integrated into the air conditioning system performance. FIG. 1 of ASHRAE Standards 55-1981 "Thermal Environmental Conditions for Human Occupancy" which provides the basis for FIG. 3 indicates the operative temperature range within which 80% of occupants feel comfortable, if the humidity and air movement are also within acceptable limits. For summer conditions assuming clothing insulation is approximately 0.5 clo, the range is 22.8° C. to 26.1° C. For humid part load conditions occurring in the Autumn when clothing insulation may be approximately 1.0 clo, the range is 19.5° C. to 23.2° C. Thus the room operative temperature is set for peak load conditions to be 26° C. and that for humid part load conditions to be 23° C., both of which temperatures are within the respective 80% acceptability ranges. These ranges are not mandatory but are selected to allow ready comparison with ASHRAE Standard 55-1981. It should be noted that they can be refined as indicated below.

Figure 3:
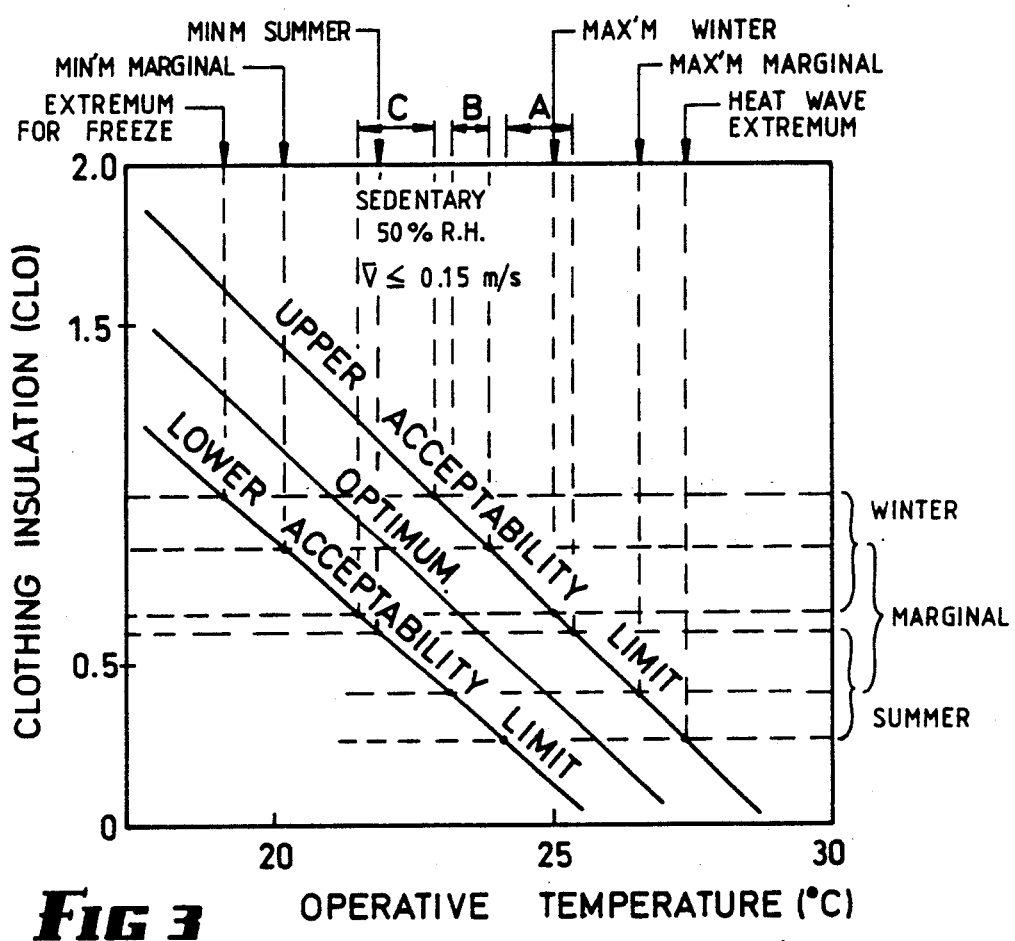
FIG. 3, extends the ASHRAE Standard 55 (1981) chart of the limits within which, statistically, 80 percent of persons involved in mainly sedentary activity are likely to feel thermally comfortable by superimposing for a range of combinations of clothing insulation and operative temperature, the diversity of clothing typical during the different seasons of the year, and the corresponding ranges of operative temperature within which the conditioned space must be maintained to satisfy the 80 percent acceptability limits. (A draft ASHRAE Standard indicates that the acceptability limits shown in FIG. 3 apply to 90 percent of occupants).

In FIG. 3 the temperature ranges have been modified to allow for the typically lighter clothing generally worn in Australia, and to accommodate a mix of clothing weights being worn by occupants. This narrows the range of acceptable operative temperatures as indicated by the ranges designated by 'A', 'B' and 'C' in FIG. 3:

SUMMER RANGE 'A' is the operative temperature range for 80% acceptability assuming no jackets shed or donned.

MARGINAL RANGE 'B' is the similarly restricted comfort range during spring and autumn.

WINTER RANGE 'C' is the similarly restricted comfort range for heating.

These ranges expand in each direction by 0.6° C. for each 0.1 clo donned (at the lower limit) or removed (at the upper limit). A light jacket adds 0.22 clo and a bolero 0.15 clo.

The following sets forth a design for an LFV-HCV-VAV system for human comfort:

In FIG. 4 is indicated the area of the ASHRAE Standard 55-1981 charts within which are satisfied the presently acknowledged human comfort conditions for peak (right hand area, 0.5 clo) and for humid part-load (left hand area, 1.0 clo) conditions for the design considered herein. A four sided area is marked in with the left side representing the boundary designating a relative velocity of <0.1 m/s and the right side a relative velocity of 0.25 m/s to define the range of acceptable relative velocities. To lie within the ASHRAE limits, the top border of the area would be represented by a dew point temperature of 16.6° C. and the bottom border by a dew point temperature of 2.7° C. However in anticipation of a revision of the standard the upper and lower bounds of the ranges indicated in FIG. 4 follow the 60% and 30% Relative Humidity lines respectively. FIG. 4 indicates the mutually compatible area for each operating condition by bottom left to top right cross hatching. To adhere to the ASHRAE Standard and to the thermal conditions found to be appropriate for human comfort the designer is constrained to operate within the very much smaller areas defined by the close cross hatching in selecting the room operative temperature. In this case FIG. 4 indicates the peak load and the humid part load performance conditions achieved by allowing flexibility of the room operative temperature. Both conditions then fall within the range in which 80% of the occupants will feel that the conditions are comfortable. Not shown is the continuum of target zones within which conditions between peak and minimum load, indicated by the continuous line, must fall to satisfy thermal comfort over the full range of operation of the air conditioning system.

The left hand column of Table 1 appended to this specification indicates the probable performance of the system with a room thermostat which varies its setting progressively as the sensible load changes from its peak value. The system performances at sensible loads which are 65 percent and 50 per cent of the peak value are shown.

FIGS. 5A and 5B reveal a LFV-HCV-VAV system which is completely compatible with the air conditioning design loads and with human thermal comfort requirements over the full range from peak to the 65 percent part load condition. Should the system move to a 50 percent part load condition the chart relative velocity lines would also move slightly to the left to accommodate the heavier clothing which is likely to be worn. The room operative air temperature on the chart would change only from 23° C. at 65 percent part load to 22.8° C. at a part load which is 50 percent of the peak sensible load.

Throughout the operating range the required relative velocity for optimum comfort would vary from 0.14 m/s at peak load conditions to 0.12 m/s at 65 percent part load and to 0.09 m/s at 50 percent part load. If the relative velocity in the room varies proportionally with the variation in volume flow of air supplied to the room and the room and supply air temperature is kept constant, the relative velocity at the 65 percent condition would be 0.09 m/s and at 50 percent, 0.07 m/s. If an increase in humidity is possible without exceeding the comfort level the small discrepancy between the relative velocity optimally desired and to relative velocity achieved could be eliminated by a small increase in the supply air temperature. This contrasts with the incompatibilities found in the earlier example design to the identical specification wherein it was found that a higher relative velocity was required for comfort at part load than that at peak load, an impossible situation.

The left hand column of Table 1 reveals the superior performance of this method in offsetting the thermal loads, meeting the ventilation loads, and achieving compatibility of the air supply requirements and the relative velocities required for comfort, thus simultaneously optimising performance and the known human comfort principles.

The above discussion and example may be summarised as follows:

Operating conditions which fall within the comfort area defined by ASHRAE Standard 55-81 may be necessary for creating "that condition of mind in which satisfaction is expressed with the thermal environment", but in most cases they will not be sufficient at all operating load conditions. At each operating load the constraints imposed by the relative velocity limits specified by ASHRAE Standard 55-1981 must also be satisfied. The relative velocity limits restrict acceptable conditions to a narrow band Within the general comfort area and, in the example above, it was shown that this narrow band traverses from right to left in response to the changes from peak to minimum load conditions of the air conditioning system. It is this movement which is accommodated by the present invention. The aim is the simultaneous energy efficient integration of load, ventilation and human comfort requirements into the design of air conditioning systems.

Figure 6A:
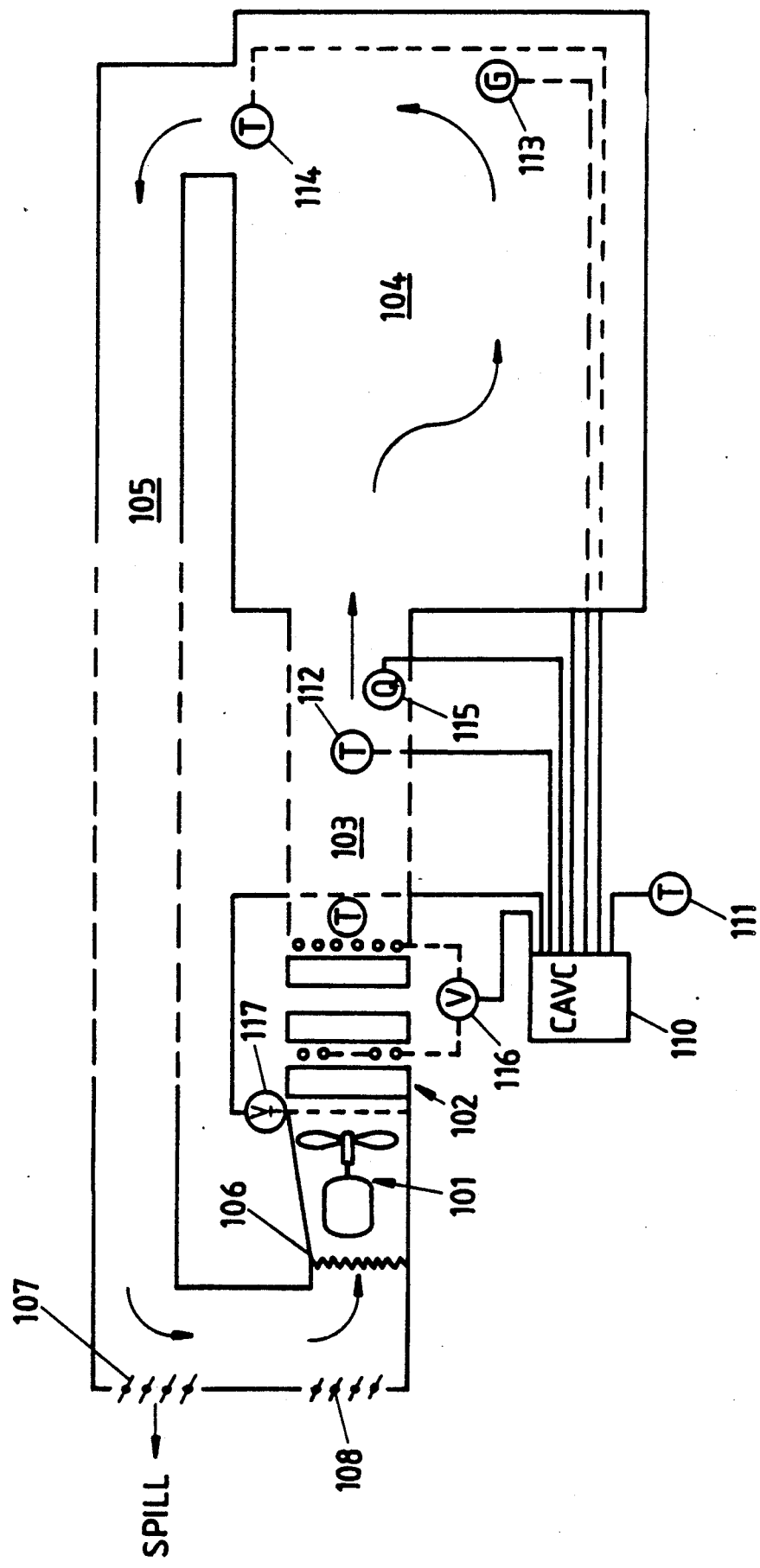
FIGS. 6A and 6B are diagrammatic representations of air conditioning installations which embody this invention, FIG. 6A representing a constant air volume system servicing a single zone, and FIG. 6B representing a multizone variable air volume system.
Figure 6B:
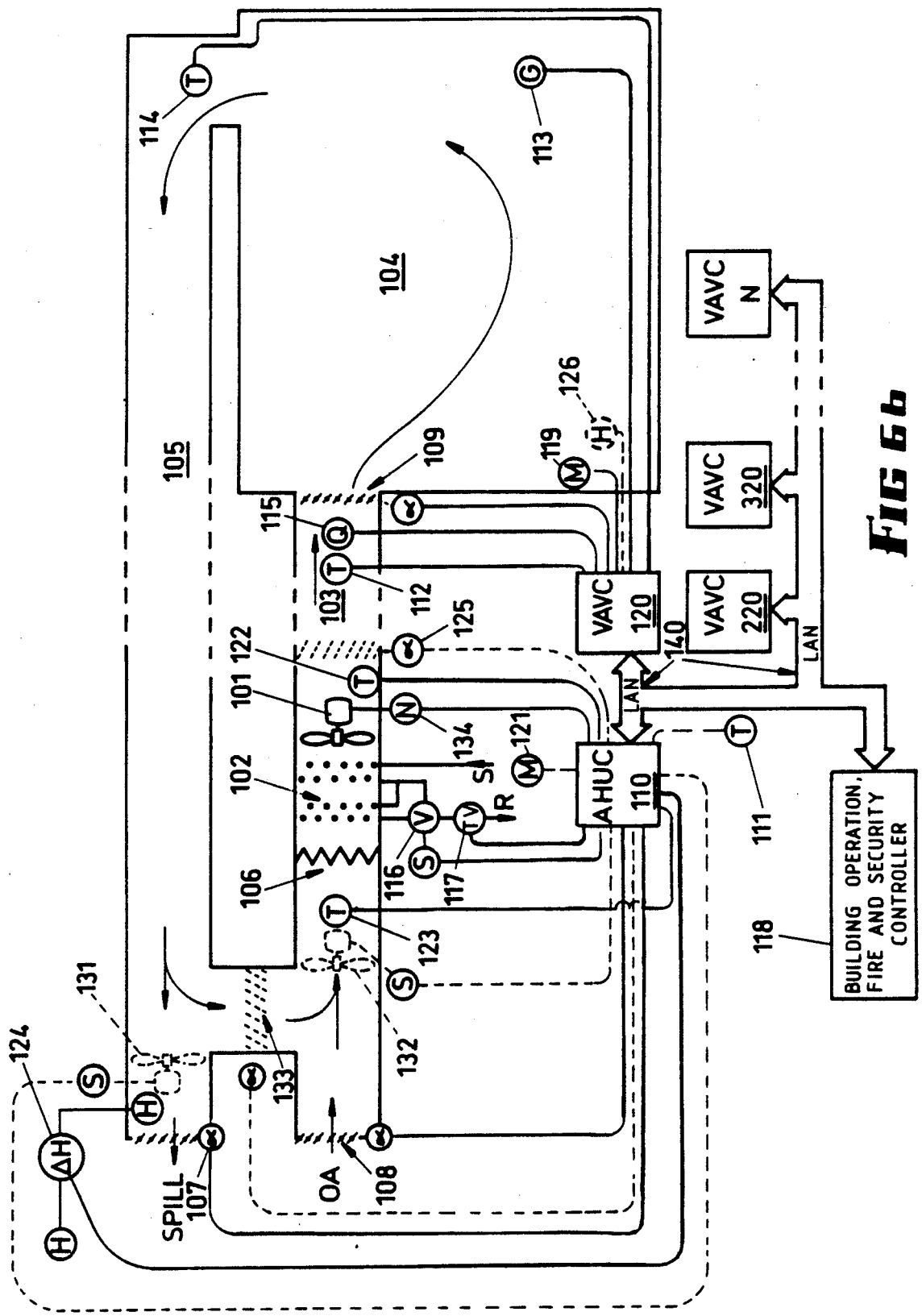

Reference is now made to the system illustrated in FIGS. 6A, 6B and 7.

In FIG. 6A, a Constant Air Volume air conditioner comprises a fan 101 which propels air through a dehumidifier 102, a duct 103, and through a conditioned space 104. The air is returned to the fan 101 through duct 105 and filters 106. Some return air is spilled through one or more controlled or uncontrolled vents 107 and this is replaced with fresh air drawn from outside via a controlled or uncontrolled damper 108. Coolant is supplied to the dehumidifier from a chiller plant (not shown).

An electronic controller 110 receives the following intelligence from sensors:

| | |
|---|---|
| ambient air temperature | thermometer 111 |
| supply air temperature (optional) | thermometer 112 |
| conditioned space operative temperature directly or via | globe thermometer 113 |
| conditioned space humidity (optional) | humidity sensor 126 |
| return air temperature | thermometer 114 |
| supply air volume flow rate (optional) | via pressure or velocity sensor 115. |

The controller controls coolant valves collectively designated 116 and throttle valve 117, as well as spill and ventilation air dampers 107 and 108 if same are active. In a CAV system, flow control dampers in the supply air duct are not used but the fan motor may have the facility of being switched between two or more speeds under the command of the controller 110.

In FIG. 6B, a Variable Air Volume air conditioner comprises a fan 101 which draws air through a dehumidifier 102 and passes it via a duct 103 and dampers 109 to a conditioned space 104 from which it is returned to the dehumidifier 102 through a duct 105 and filters 106. As with the CAV system of FIG. 6A some return air is spilled through one or more controlled or uncontrolled vents 107 and is replaced with fresh air drawn from outside via a controlled or uncontrolled damper 108. Optionally there may be a spill fan 131 and/or a return air fan 132 and/or return air dampers 133 also in the return air path. Also a supply air damper 125 may be used to effect change in the volume of air delivered by the fan. Preferably such change would be effected by variation of the speed of the fan motor by means of variable speed drive 134.

The control function is shown in FIG. 6B to be divided between a local zone VAV controller 120 and the Air Handling Unit (AHU) controller 110. The two controllers can be combined into a single unit but for clarity here and for larger systems involving several zones it is convenient to locate the zone controllers 120, 220, 320, etc. within the several zones and use a Local Area Network (LAN) 140 or similar communication means to send and receive information to and from the Air Handling Unit controller.

The zone VAV controller 120 receives the following intelligence from sensors:

| | |
|---|---|
| supply air temperature at zone | thermometer 112 |
| conditioned space operative temperature . . . directly or via | globe thermometer 113 |
| zone and return air temperature | thermometer 114 |
| supply air volume flow rate | via pressure or velocity sensor 115 |
| zone supply damper setting | angle 109. |
| "humidity (optional) RH or DP | 126" |

In addition the zone VAV controller 120 receives both sensed and processed intelligence from the AHU controller 110, for example information about ambient conditions.

Zone controller 120 has various manual inputs 119, some of which are set during commissioning of the system, some of which may be set seasonally, and in simple systems some of which may be input at intervals throughout a day. These manual inputs are delineated below in the discussion of the control function. Manual inputs common to all zones are best input directly to the AHU controller, as indicated by 121, and then communicated to all zones via the LAN 140 if a distributed control system, as illustrated, is employed.

At its simplest level the zone VAV controller could be a conventional thermostat which could be reset manually by the occupants of the zone with the aid of a look-up table of settings for different times of year, levels of activity, sun angle and daily weather forecast. In more sophisticated applications the above parameters are either sensed directly or determined by calculation or from information stored in the memory banks of the controllers 110 and 120.

The AHU controller receives the following intelligence from sensors:

| | |
|---|---|
| ambient air temperature | temperature 111 |
| supply air temperature leaving AHU | temperature 122 |
| mixture temperature entering AHU | temperature 123 |
| enthalpy difference between return air and ambient | enthalpy difference 124 |
| fan motor speed | tachometer 134 |
| supply air damper setting (if fitted) | angle 125 |
| coolant throttle valve setting | angle or travel 117 |
| dehumidifier change-over valve | status 116 |
| spill fan (if fitted) | status 131 |
| return air fan (if fitted) | status 132 |
| return air damper setting (if fitted) | angle 133 |
| spill air damper setting (if active) | angle 107 |
| ventilation air damper setting (if active) | angle 108 |
| manual inputs | alpha-numeric 121. |

In addition the AHU controller sends information to and receives information from the various zone controllers and maintains communication with the central building system controller 118 via the building Local Area Network (LAN) 140.

FIG. 7 shows diagrammatically one possible configuration of the dehumidifier 102, which comprises three coil rows each with eight passes. It will be seen from FIG. 7 how, even with minimum effective size, the full area of air flow always intercepts active cooling coils. By bypassing flow in some coils (bypass tubes 135), high coolant velocity is maintained (U.S. Pat. No. 4942740).

Figure 8:
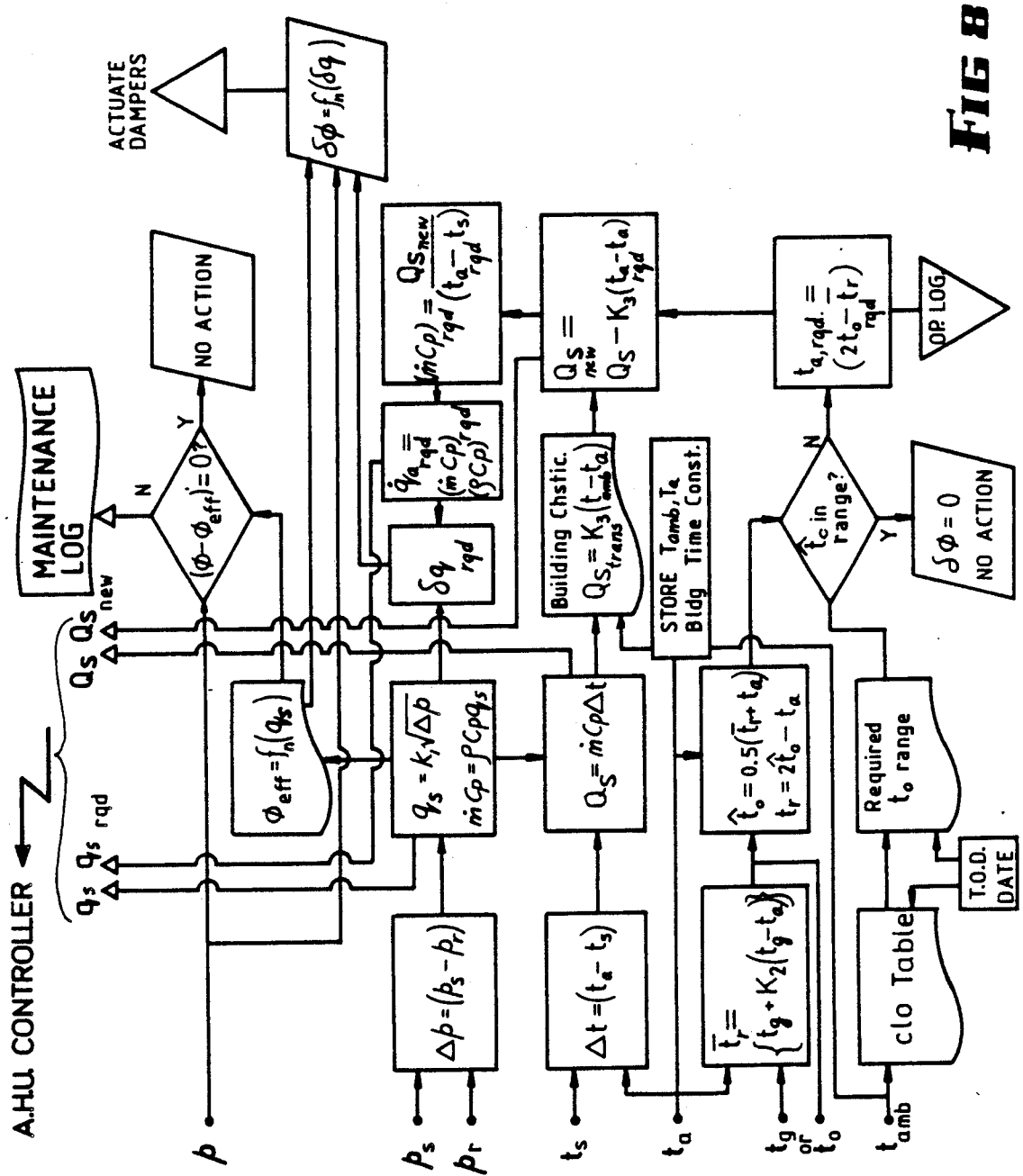
FIG. 8 is a logic chart for a local controller incorporating the technology of this specification in a VAV system.
Figure 9:
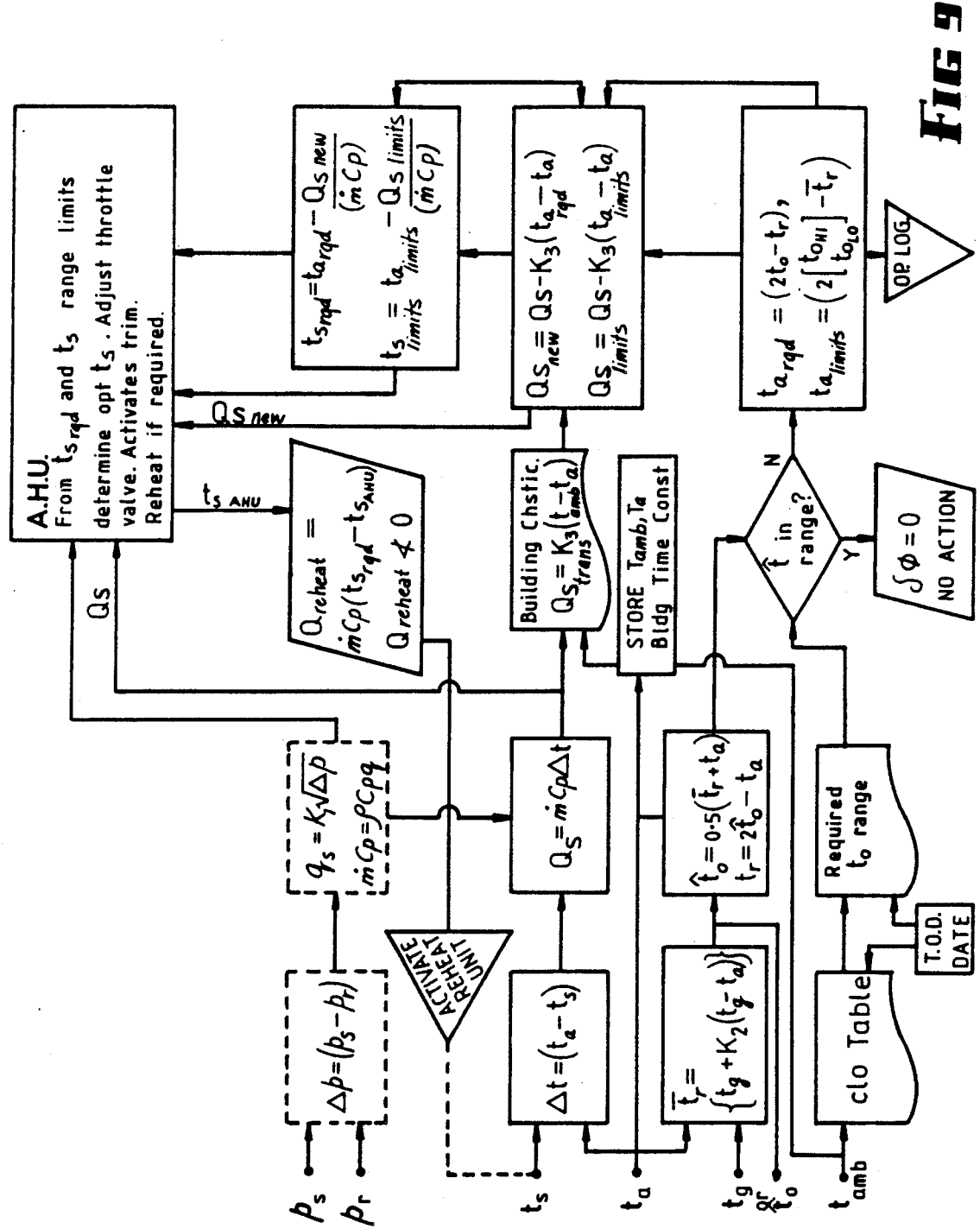
FIG. 9 is a logic chart for a local controller incorporating the technology in a CAV system.

The following sets forth the control system:
Reference is made to FIGS. 8 and 9:

Each zone served by an air handling unit has a local controller, preferably but not essentially of the programmable type. At the minimum level of control a zone thermostat which is manually adjustable according to a table of settings is required. The following description relates to the use of a programmable controller in the absence of direct sensing of humidity. With humidity sensing the complete comfort equation and predicted mean vote can be solved as detailed earlier in this specification.

Two types of factors are required as inputs by the control system; physical/environmental factors and personal factors relating to the occupants. Factors of the first type may be sensed by conventional means. Factors of the second type may be deduced with the aid of tabulated data.

The local zone control function requires
(a) estimation of the zone sensible load,
(b) estimation of the actual operative temperature in the zone,
(c) computation of the optimum and acceptable range of operative temperature,
(d) determination of the 'offset' between (b) and the optimum,
(e) initiation of action to bring the 'offset' within the acceptable range.

The above functions are embodied in the zone control logic diagram, FIG. 8, for a VAV system. In the most preferred embodiment the optimum air temperature in the zone is calculated directly from the comfort equation to yield $L=0$. Both humidity and mean radiant sensors must be fitted for this embodiment.

We now consider each of the above control requirements in turn:

(a) The zone sensible load may be obtained from measurements of the volume flow rate $q_s$ of the supply air (obtained either from the measurement of the pressure difference across some known constriction or from knowledge of the flow characteristic as a function of supply air damper angle for a measured supply air pressure) and measurement of the rise in temperature of the supply air between inlet to and outlet from the zone. The zone sensible load is then calculated from $Q_s = \rho_s q_s c_p (t_a - t_s)$ where $\rho_s$ is the density of the supply air, $c_p$ is the specific heat of the air and $t_a$, $t_s$ are the temperatures of the return (room) and supply air respectively. This expression can be recognised as the familiar relationship $Q_s = mc_p \Delta t$ where m is the mass flow rate of air and $\Delta t$ is the temperature difference across the load.

(b) The actual operative temperature is approximately equal to the average of the mean radiant temperature $t_r$ and the temperature $t_a$ of the air in the room. The room air temperature may be measured directly by conventional means. The mean radiant temperature $t_r$ is the uniform temperature of the surface of a radiantly black enclosure in which the occupant would exchange the same amount of heat by radiation as in the actual non-uniform room. It can be calculated if the room geometry and the temperatures of all surfaces are known. Such information is seldom known and hence approximations are necessary. The mean radiant temperature can, however, be derived from measurements of the air temperature, the relative velocity of air movement v and the "globe temperature" $t_g$. The latter is the temperature measured at the centre of a six inch (0.15 m) diameter thin walled non-reflective sphere. The mean radiant temperature is then calculated from $$t_r = t_g + k \sqrt{v} \, (t_g - t_a)$$

where temperatures are expressed in Celsius degrees, velocity is in meters per second and $k = 2.2$.

It has been found in tests that natural convection places a lower limiting value on the velocity v. Thus the above equation should carry the qualifying statement "$v \geq 0.05$ m/s".

If the diameter, d, of the globe thermometer sphere differs from 0.15 m, the value of k is adjusted according to the equation $$k_d = k \, (0.15/d)^{0.4}.$$

A. P. Gagge, G. M. Rappe and J. D. Hardy (ASHRAE Inc, May 1967, p.63) showed that if the outer surface of the standard globe is painted a skin colour, the temperature measured at its centre closely approximates the operative temperature. However the time constant for such a sensor is of the order of 30 minutes which, apart from its obtrusive bulk, makes it unsuitable as a control sensor in a practical air conditioning system. An integral part of the control system of the present invention is the use of unobtrusive miniature direct measuring operative or globe temperature sensors with short time constants. The relative velocity at the miniature globe location is measured during commissioning of the system. By this means a good approximation to the mean radiant temperature may be obtained. In practice several miniature globes are used to sample the distribution of mean radiant temperature through the zone. ASHRAE Standard 55-1981 specifies the locations at which measurements should be made.

(c) The optimum operative temperature is that operative temperature which satisfies the greatest number of similarly clad occupants in a given room for a given relative humidity and given relative velocity. The acceptable range of operative temperatures for these subjects is variously defined but ASHRAE Standard 55-1981 specifies acceptability as being the band of conditions within which eighty percent of occupants are slightly cool, neutral or slightly warm. It is possible to determine this band by calculation from the "comfort equation" and reference to statistical data derived from the responses of many volunteers who participated in tests, as described earlier in this specification. In the proposed revision of the Standard, designated (55-1981R), the acceptance criterion has been raised to ninety percent. The present embodiment further allows for the most probable range of clothing worn by occupants at a given time.

(d) The "offset" between the calculated operative temperature and the optimum operative temperature is obtained by simple difference. This difference is then compared with the "acceptable range" of operative temperatures.

(e) If the offset is not within the acceptable range the control system then initiates corrective action by changing the air temperature in the zone. Typically this would involve an increase or decrease of the air flow to the zone which could be achieved by the opening or closing of the supply air damper in the duct leading to the particular zone.

Note that items (b) and (c) require a knowledge of the insulating values of the range of clothing most likely to be being worn by the occupants of the building or of a particular room or zone of the building. Several means by which this may be determined or estimated may be envisaged. For example, in some zones within a building the occupants may all be required to wear a particular uniform or protective clothing at all times. The insulation value, measured in the units of clo where 1 clo=$0.155m^2$ K/W, can be accurately measured and then becomes a unique value in the calculations. For such a circumstance the range of acceptable temperature is a maximum.

By contrast, in a typical office building or department store the range of clothing worn by the occupants is usually diverse. It would be possible for a doorman with a trained eye to assess the range of clothing being worn as employees arrive at work. This information could then be translated into a range of clo values. The wider the range of clo values to be accommodated, the narrower is the range of temperatures which are acceptable.

An alternative to use of the observing skills of a doorman would be to estimate the most probable range of clothing being worn. The choice of clothing depends on the local culture, on the type of activity, on the time of year and on the early morning weather forecast. Within a given culture and type of activity, the time of year can be determined from the clock within the computer or controller and the likely variation about the clothing typical of that time of year is dependent largely on the outside ambient temperature, which can be measured directly. Thus estimates of the likely range of clo values for that particular day may be made. It is good practice to err on the high side in making this estimate during the cooling period as it is usually easier for a well clad person to remove a coat or jacket than for a lightly clad person to find means to keep warm.

In addition to the local zone controls, the Air Handling Unit operation is also supervised by a controller. At the simpler level this controller is an air-off thermostat, which actuates a valve or valves to adjust the flow of coolant through the dehumidifier coil so to maintain the air-off temperature constant, and conventional means of measuring and controlling the air supply volume for a VAV system, or to keep the zone temperature at the set point determined by the zone controller for the CAV system. It is better practice for the controller to be a programmable controller which receives data from each of the zone controllers and, from a pre-programmed "performance map" for the particular system determines the optimum combination of operating point for the air flow fan, active coil area, coolant flow rate and, in the case of a direct expansion (DX) system, the speed of the compressor.

The control system described herein maintains an ongoing record of past actions and of the results of those actions. These data can be used to update and refine the aforesaid performance map.

Referring now to the logic diagram for a VAV System, FIG. 8, the air flow volume $q_s$ is proportional to $\Delta p$ and is calculated by the controller according to the formula $$q_s = K_1 \sqrt{p}$$

where $K_1$ is a proportionality constant determined during design or during commissioning. Alternatively $q_s$ could be calculated from a flow vs damper angle calibration.

From the measurement of $q_s$ may be obtained the quantity $mc_p = c_p q_s$, where m=mass flow rate of air and
  $\rho_s c_p$=specific heat of air.
  $\rho_s$=density of supply air This quantity, when multiplied by the difference between the measured temperatures of the air leaving the zone $t_a$ and the air supplied to the zone $t_s$, yields the zone sensible heat load $Q_s$, as indicated earlier.

From knowledge of the thermal characteristics of the building, determined during design or measured on site, and measurement of the ambient temperature, an estimate can be made of the part of the sensible heat load $Q_s$ which is due to transmission of heat through the walls, windows and, where appropriate, roof of the building. Thus $Q_{strans} = K_3(t_{amb} - t_a)$, where $K_3$ is the relevant factor in the building characteristic. Allowance could if necessary be made for direct sun load on the wall or roof of the building.

It should be noted that the thermal mass of the building fabric will cause the building to respond only slowly to changes in either ambient or room temperature. Thus the actual value of $Q_{strans}$ at any given time will be determined by the values of $t_{amb}$ and $t_a$ at earlier and usually different times. For this reason these values are stored and then retrieved after a time delay determined by the building time constant. The values of $Q_{strans}$ are similarly stored for use in determining the internally generated sensible load in the zone as a function of time. This information is of value to building managers for planning purposes. Also, in a lightly constructed building as are many existing office buildings, the building time constant is short and the effects of changing the internal air temperature cause the transmitted sensible load to change after only a short time. In these circumstances it is appropriate to anticipate the change by computing a new sensible heat load as follows:

$$\text{old } Q_s = \text{old } Q_{sinternal} + \text{old } Q_{strans}.$$

$$\text{new } Q_s = \text{new } Q_{sinternal} + \text{new } Q_{strans}.$$

But old $Q_{sinternal}$ = new $Q_{sinternal}$.

$$\begin{aligned}\text{Hence new } Q_s &= \text{old } Q_s - \text{old } Q_{strans} + \text{new } Q_{strans} \\ &= \text{old } Q_s - K_3(t_{arqd} - t_a)\end{aligned}$$

where $t_{arqd}$ is the new required air temperature and $t_a$ is the existing air temperature.

From the new $Q_s$ the required supply air quantity can be calculated from $$(mc_p)_{rqd} = \text{new } Q_s/(t_{arqd} - t_a)$$

-continued or $$q_{srqd} = \frac{old \cdot Q_s}{\rho_s c_p (t_{arqd} - t_a)} - K_3/\rho_s c_p$$

The zone dampers can then be adjusted and information relayed to the AHU controller.

As an example of the many additional capabilities of the type of control system described herein, any discrepancy between the actual damper angle ($\emptyset$), and the angle determined by the controller can be reported immediately the computer based maintenance log. Limit alarms may be set and operating costs can be accurately recorded and reported in a readily understandable form.

As a further feature of the control strategy of the present invention, when used in association with the LFV/HCV method of air conditioning which is the subject of U.S. Pat. No. 4942740, where the occupancy of the zones served by an AHU falls to zero in the evening, the system can be set to run on a maximum dehumidification cycle for a defined period to dry out all ducts, carpets, fabrics and papers. This may be achieved by operating with maximum coolant velocity in the portion of the coil which operates at minimum load, and reducing the face velocity, and hence the air flow volume, to not more than 0.5 meters per second. This procedure eliminates the possibility of mould or bacterial growth in the ductwork and on the building fabric and furnishings.

The air handling unit (AHU) controller receives information from all local controllers (FIG. 8), adds together the sensible heat loads and the volumes of air demanded, sets the ventilation air quantity on the basis of the needs of the most lightly loaded zone and calculates the best combination of effective dehumidifier size, coolant flow rate, fan speed and main supply air damper position to satisfy the air supply needs of the conditioned zones. A time delay ensures that zone dampers are set after the setting of the AHU parameters. For a DX system the compressor speed (suction pressure) is also optimised.

When radiation is important the air temperature does not equal the operative temperature and the diurnal and seasonal variations then ideally require a measure of mean radiant temperature, or a direct measurement of operative temperature, to be input to the control system, as indicated above. Nevertheless it is possible to achieve improved results from cheaper options such as allowing sensible load only to determine the room temperature, or the least expensive option of all, relying on the manual adjustment of each zone or room thermostat setting according to tabulated or calculated values derived from the comfort equation.

The control logic for a CAV system, FIG. 9, differs from that for the VAV system, FIG. 8, only in the control action which is taken. Where the action taken in the VAV system is to adjust a damper angle and report data to the AHU controller, the CAV control system (which will usually be an integral part of the AHU control system) reports to the AHU controller the air temperature required in the zone to achieve the required operative temperature. The AHU controller then determines from the requirements of other zones, if any, the optimum supply air temperature to minimise the reheat throughout the system.

The following sets forth a constant air volume (CAV) system with comfort integration:

In the comparative analysis above with and without comfort integration, discussion has concentrated on a LFV-HCV-VAV system. This is because such a system now represents "best practice", as it combines low energy consumption and broad multizone capabilities. However, although the simultaneous air quantity required at any part of the diurnal cycle may not vary greatly because of the diversity in the demands of individual zones within a multizone VAV system, this very factor may reduce the air change rate in some low load zones below the necessary ventilation levels. The constant air volume (CAV) system does not suffer from this problem.

In the conventional CAV air conditioning system the air flow rate is kept constant to all areas served and all areas are sufficiently similar for them to be treated as a single zone. The coolant flow rate is throttled with reduction in load, as in the case of the VAV system, but unlike the VAV system the leaving dry bulb temperature from the coil is allowed to rise to maintain a fixed room dry bulb temperature. This characteristic of the CAV system has an adverse effect on part load performance. The slope of the coil condition curve decreases during part load conditions resulting in reduced dehumidification per unit of cooling; this is precisely the opposite of that which is required to offset the lower sensible heat ratio. It is for this reason that in the past CAV systems have often employed overcooling to satisfy latent heat load and reheating to re-balance the sensible heat load. Where several zones are served by the one dehumidifier coil and zone differences are significant, practice has been to satisfy that zone requiring the lowest supply air temperature and to reheat the air as it is admitted to each other zone to achieve the required air condition in that zone. While the degree of comfort which can be achieved by such a system may be good, it uses energy at a rate which is now considered unacceptable for other than special applications by most responsible designers.

In the application of the comfort integration of this invention to a CAV system, which ideally should not be faced with zone diversity, rather than adapting to the sensible load by varying the sensible temperature of the supply air, supply air temperature and dehumidifier capacity are initially held substantially constant while the room or zone thermostat or controller is first reset to offset the load and to achieve as closely as possible the required operative temperature. If insufficient control is available by this means, and coil size is fixed coolant flow through the dehumidifier is varied to result in a change in supply air temperature. This strategy maintains dehumidification capacity more effectively than does conventional practice. If zone diversity is present, part load rooms or zones are set to maintain a lower temperature than are peak load rooms. Terminal reheat requirements are thus reduced to "trimming".

Where a constant air volume system serves several zones these zones should, according to good design practice have very nearly the same behaviour of thermal load conditions. Where variations do occur, the zone with the consistently least thermal load would serve as a master zone governing all the zones on the same system and would determine the sensible temperature setting in that "master" zone. However reheat coils would be provided to the associated similar zones to permit adjustment of room temperatures to the same room sensible setting. Only when these other rooms have different mean radiant temperatures would it be necessary too to have variable room temperature thermostats to establish the appropriate room sensible setting given the mean radiant temperature and the seasonal operative temperature.

In lightly loaded interior zones it is known that the mean radiant temperature is equal to the room sensible temperature in which case the seasonal operative temperature will also be equal to the "master" zone sensible temperature setting and no separate measurement of mean radiant temperature is required. If perimeter zones are involved, measurement of radiant temperature in one zone only, together with predetermined information on diurnal diversity and tabulation of the typical seasonal operative temperatures will allow automatic (or manual) determination of the required room sensible temperature setting without the need for additional globe thermometers. The required room sensible temperature will be established through control of the chilled water throttling valve. The temperature regulating means and valves controlled by the controller operate in such manner as to limit the range of temperatures within the conditioned space to between 22° C. and 27° C. as established by comfort standards.

Although the systems described use more energy than do the VAV systems for the same duties, they are far less wasteful than the conventional CAV system which seeks to maintain a constant room dry bulb temperature in all rooms at all times. The important difference between the conventional CAV system and the CAV system with comfort integration is that in the latter the coil condition curve initially becomes steeper as load decreases so allowing the latent load to be offset without the need for such severe overcooling as that required by the conventional system.

The invention has further advantages:

In addition to satisfying thermal loads successfully and achieving optimum comfort, an examination of Table 1 reveals several further advantages contributed by the method of this invention. Here the same system of air conditioning, the LFV HCV-VAV system, is compared for the same design specification for the same office building, with and without comfort integration.

(a) The air handling unit supply air fan is smaller. Within the present invention the air fan is selected for only 4800 LPS as compared with the system designed without comfort integration which requires 6000 LPS. This reduces capital cost and running cost. The reduced size of the supply air fan results from the increased temperature difference across the room allowed by ASHRAE 55-1981 and a reduction in the heat transmission to the rooms due to the smaller temperature difference between outside and inside conditions during peak load conditions. In the case of the example shown in Table 1, the difference across the room load ratio line from [24° C.-12.4° C.]=11.6° C. to [26° C.-12.4° C.]=13.6° C. reduces the 6000 LPS requirement to 11.6/13.6×6000=5118 LPS.

(b) There is also a reduction in the cooling load. The heat transferred to the perimeter rooms by transmission from the outside is reduced. Conservatively the transmission gains account for 25 percent of the cooling load and the transmission temperature difference due to the higher 26° C. room temperature is reduced by 25 percent. Thus, (0.25×0.25) or 6.25 percent of the sensible load is eliminated. Therefore at peak load the volume flow rate can be further reduced to 5118 (1−0.0625)=4800 LPS.

(c) The multizone capability of the VAV system is increased. To indicate how well an air handling unit according to the present invention can accommodate widely diverse zonal loads, consider a multizone unit under simultaneous peak design load conditions. Three zones only are considered for simplicity; a nine zone system with each zone having provision for separate selection of clothing insulation value has recently been designed.

In the earlier comparison of Table 1, to demonstrate the human comfort conditions anticipated by the method of the present invention, the performance of a single zone only was considered. The three operating conditions were presented as if each related to a separate zone serviced by a separate, dedicated air handling unit. However it is the simultaneous design peak load performance which in practice determines the selection of the coil and the fan in an air handling unit designed to service several zones. The simultaneous peak load including all zones is always less than the sum of the individual zonal peak loads and hence smaller components and less energy are required than would be required to satisfy the sum of the maximum loads in each zone, a feature which is already well known to designers. To select the air handling unit we will assume for the purpose of this illustration that the three coil stages listed in Table 1 occur simultaneously and together set the simultaneous peak design load. We also assume that the individual peak load energies, which occur at different times in each of the three zones, are equal. One can visualize that the air handling unit reaches the simultaneous peak load at 4 pm in the afternoon of a midsummer day. Assume on the basis of typical figures for a high rise building that the 100% load stage indicated in Table 1 represents the west zone and that this zone consumes 55 percent of the total air handling unit energy. The north, south and east facades are combined to form a second zone which at 4 pm is operating at an average of 60 percent of the maximum load in this second zone, and is found to consume 35 percent of the air handling unit energy. The interior of the building is the third zone which at the time of the simultaneous peak load is operating at its almost steady state level of ten percent of the air handling unit energy.

In Table 1 it was assumed that the two part-load zones of 65 percent and 50 percent occurred on marginal weather days when occupants would be attired with medium clothing. These two part load zones are now considered simultaneously with the peak summer design day and therefore the control system, knowing the time of year and sensing the ambient air temperature, $t_{amb}$, of 36° C. (see lower left corner of FIG. 8 Control Diagram) establishes the appropriate range of clo values. These are then used to adjust the operative temperature to its optimum value of 24.5° C. to achieve a comfortable environment for the lightly attired occupants of these zones. (In the earlier example the operative temperature for these zones was only 23° C., the difference being due to the heavier clothing worn by the occupants during the marginal weather season). Table 2 indicates the simultaneous peak performance. The volume flow rate required with Comfort Integration is further reduced to 4136 LPS. For comparison, the LFV-HCV-VAV system without Comfort Integration would require, for the same simultaneous peak design, 4965 LPS of conditioned supply air. The ratio of the two requirements in this case is similar to that found in the Table 1 comparison. It should be stressed that this example is a particular hypothetical case and the numerical values could vary considerably. The following comparison should therefore be treated as being qualitative only:

(a) The reduced peak load means a smaller chiller, cooling tower, piping and ductwork.

(b) There is an advantage in dehumidifier design. The reduced volume flow rate of the supply air means a smaller face area coil can be used. Alternatively, if peak loads are associated with low sensible heat ratios, as on the Eastern seaboard of the United States and in the tropics, the advantage of a further reduction in face velocity through the larger coil face area can be utilized in the selection for 4136 LPS to give a steeper slope to the coil condition curve and so to increase dehumidification. In this circumstance it is sometimes possible to reduce the number of rows of depth of the coil.

(c) There is a greater flexibility in design. The addition of comfort integration to the system provides a wider range of multizone performance in that each room has its preferred operative temperature and its preferred relative velocity. Thus fewer air handling units may be required.

(d) The "Coanda effect" in slot distribution registers is preserved at low loads. When the VAV system is employed over a range from peak to say 50 percent of sensible load, there is a danger that the Coanda effect may be lost due to low air flow through the registers, resulting in "dumping" of cold supply air and considerable consequent discomfort. As indicated in Table 1 the volume ratio between the peak and the 50 percent part load operation is 0.5 for the system without comfort integration, but is 0.64 with comfort integration. A drop from 6000 LPS to 3000 LPS may be a problem. However a drop from 4800 LPS to 3080 is unlikely to disturb the Coanda Effect (see Table 1).

(e) Wasteful use of energy in inefficient fan assisted VAV boxes is eliminated. Fan assisted VAV boxes are used to increase the supply air quantity at low loads to maintain the Coanda effect and to increase air movement and obtain a degree of reheat by blending a proportion of warm return air with the conditioned supply air. This design practice increases the cost of the VAV boxes and also increases the operating cost since the small fans are inefficient. Furthermore unfiltered return air can be unhealthy especially if photocopiers or smokers are located in the zone (Fanger, 1987). In the "comfort integrated" system the decreased peak air flow rate coupled with an increased minimum air flow rate eliminates the need for this costly and inadequate solution.

(f) There is improved ventilation to the air conditioned rooms. This is a side benefit arising from the increase in the supply air volume flow ratio between part load rooms and peak load rooms. Even if conventional VAV systems increase the overall ratio of outside air to return air passing through the air handling unit during marginal weather, the minimum part load rooms will still receive a smaller volume of outside air than do the simultaneously higher part load rooms.

(g) Air conditioning performance is improved over those systems designed to reset their supply air temperatures upwards during marginal weather. In order to increase the supply air volume to low part load rooms, reset of the temperature of the supply air leaving the dehumidifier coil is common. Wherever humidity is a significant factor this is poor practice since the lower part load rooms characteristically have the lower sensible heat ratios and therefore demand more dehumidification. Upward reset of the supply air temperature is associated with a higher surface temperature at the dehumidifier which reduces the dehumidification. Furthermore rooms which experience an increase in load during the period of upward reset may not be able to have them offset. With the comfort integration of the present invention, the supply air temperature remains constant and rooms with very low loads have their operative temperature decreased automatically, with the result that they receive an increased air supply and the required level of dehumidification can be achieved.

TABLE 1

PROJECTED ZONE PERFORMANCE IN A DESIGN FOR A PERTH, WEST AUSTRALIA HIGH RISE OFFICE BUILDING

|  | With Comfort Integration of this Invention | Without Comfort Integration of this Invention |
|---|---|---|
| FULL COIL STAGE During 100% load |  |  |
| Rm dbt °C.* | 26° C. | 24° C. |
| Supply air dbt °C. | 12.4 | 12.4 |
| Rm W g/kg | 9.28 | 9 |
| Rm RH % | 44% | 48% |
| Sim. Supply Air LPS | 4800 | 6000 |
| Rm Sens Load lw | 79 | 83 |
| Rm SHR | 0.87 | 0.87 |
| Tot Cooling Capacity kw | 110 | 116 |
| Tot Water LPS | 3.6 | 4.0 |
| PART COIL STAGE 65% Load |  |  |
| Rm dbt °C.* | 23 | 24 |
| Supply Air dbt °C. | 12.4 | 12.4 |
| Rm W g/kg | 10.6 | 10.6 |
| Rm RH % | 60% | 57% |
| Supply Air Vol LPS | 4000 | 3900 |
| Rm Sens Load kw | 51.0 | 54.3 |
| Rm SHR | 0.65 | 0.67 |
| Tot. Cooling kw | 88.4 | 90.2 |
| Tot. Water LPS | 4.5 | 4.5 |
| Peak to 65% Part Load Supply Volume RATIO | 1.20 | 1.54 |
| PART COIL STAGE 50% |  |  |
| Rm dbt °C.* | 22.8 | 24 |
| Supply Air dbt °C. | 12.4 | 12.4 |
| Rm W g/kg | 11.3 | 11.5 |
| Rm RH % | 64% | 61% |
| Sup Air Vol LPS | 3080 | 3000 |
| Rm Sens Load kw | 39.6 | 42.0 |
| Rm SHR | 0.60 | 0.60 |
| Tot. Cooling kw | 7.10 | 74.9 |
| Tot. Water LPS | 2.8 | 3.0 |
| Peak to 50% Part Load Supply Volume RATIO | 1.56 | 2.00 |

*As indicated on FIG. 3 charts it is assumed air dry bulb temperature, $t_a$ = mean radiant temperature, $t_r$.

TABLE 2

PROJECTED PERFORMANCE OF AIR HANDLING UNIT AT SIMULTANEOUS PEAK

|  | With Comfort Integration | | Without Comfort Integration | |
|---|---|---|---|---|
|  | kw | LPS | Kw | LPS |
| West Zone at 55 percent of A.H.U. Load | 60.5 | 2640 | 63.8 | 3300 |
| East, North & South Zones at 35 percent of A.H.U. Load | 31.0 | 1232 | 31.5 | 1365 |
| Interior Zones at 10 percent of A.H.U. Load | 7.0 | 264 | 7.6 | 300 |

TABLE 2-continued

| PROJECTED PERFORMANCE OF AIR HANDLING UNIT AT SIMULTANEOUS PEAK | | | | |
|---|---|---|---|---|
| | With Comfort Integration | | Without Comfort Integration | |
| | kw | LPS | Kw | LPS |
| TOTAL | 98.5 | 4136 | 102.9 | 4965 |

We claim:

1. A method of cooling a space by air conditioning said space within a relatively narrow comfort target zone as depicted on a psychrometric type chart, itself generally within a relatively broad standard comfort zone, the factors determining said narrow target zone including the heat transfer resistance of occupants' clothing and level of physical activity, the method employing an air conditioner having a dehumidifier and comprising:

determining air dry bulb temperature and at least one of mean radiant temperature and operative temperature in said conditioned space, and controlling:

(a) one at least of temperature of supply air to said space, and dry bulb air temperature leaving said space, (b) effective size of said dehumidifier while maintaining coolant velocity through said dehumidifier to between the equivalent of 1 and 2.2 meters per second of chilled water, and (c) humidity ratio in said conditioned space to be above four grams of water vapour per kilogram of dry air by increasing at least one of leaving temperature of the supply air from, and effective size of, said dehumidifier when said humidity ratio approaches said four grams per kilogram.

2. A method according to claim 1 wherein said operative temperature within said conditioned space is controlled by determining said mean radiant and said air dry bulb temperatures and adjusting said air dry bulb temperature to be less than the operative temperature by the same amount as the mean radiant temperature exceeds said operative temperature.

3. A method according to claim 1 wherein said mean radiant temperature within said conditioned space is determined and further comprising controlling temperature of supply air to said conditioned space to be sufficiently cool to offset the sensible heat load and the effect of said mean radiant temperature on the thermal comfort of occupants within said and controlling said relative air velocity over occupants to be compatible with the operative temperature required for said thermal comfort.

4. A method according to claim 1 wherein said dehumidifier comprises a plurality of coil portions, a plurality of coil valves interconnecting said coil portions, a plurality of coil bypass tubes, and a throttle valve, said coil portions, coil valves and coil bypass tubes being in a configuration controllable to vary the effective cooling size of said dehumidifier;

said method comprising effecting control of said coil valves to bypass flow selectively from portions of the dehumidifier coil through said coil bypass tubes to reduce the effective cooling capacity of the dehumidifier upon reduction of load, but retain said coolant flow through said coil portions to be the equivalent of between 1 and 2.2 meters per second of coolant.

5. A method according to claim 4 wherein said air conditioner comprises a fan which causes air flow through said dehumidifier, said method comprising limiting said air flow to be sufficiently low that humidity ratio within said conditioned space does not exceed thirteen grams of water per kilogram of dry air, but is not less than four grams per kilogram.

6. A method according to claim 4 wherein said air conditioner comprises a fan which causes air flow through a plurality of rows of said dehumidifier coil, and the configuration of said coil portions is such that said bypass of coil portions is effected while retaining active coil portions over the whole of a path of said air flow through said rows of dehumidifier coil.

7. A method according to claim 4 wherein the space is conditioned by a constant air volume system comprising effecting said control by initially maintaining supply air temperature and dehumidifier capacity constant and resetting said air dry bulb temperature in the conditioned space, until the temperature in said conditioned space approaches limits of said narrow comfort zone, and then effecting said control of said coil valves to vary size of said dehumidifier.

8. A method according to claim 1 further comprising determining volume flow rate of air through said conditioned space, globe thermometer temperature in relevant portions of said conditioned space, and ambient temperature, computing operative temperature, comparing said computed operative temperature with a temperature in said narrow comfort target zone, and effecting adjustment of one at least of (a), (b) and (c) of the steps of claim 1 as required to maintain said space within said narrow comfort target zone.

9. A method according to claim 1 further comprising determining volume flow rate of air through said conditioned space, globe thermometer temperature in relevant portions of said conditioned space where said globe temperature differs from said air temperature, ambient air temperature, at least one of relative humidity, dew point and humidity ratio in said conditioned space, computing the thermal energy balance for at least one occupant of said space to determine the equilibrium air temperature at which said occupants would be in thermal equilibrium with the environment of said space, and adjusting said air temperature to said equilibrium value while maintaining at least one of humidity ratio between 4.2 and 12 grams of water per kilogram of dry air and relative humidity between 30 and 60 percent.

10. A method according to claim 1 further comprising effecting said control so that the conditions in said conditioned space require the ratio of air flow in a variable air volume system for fifty percent of the peak sensible heat load to that for said peak sensible heat load to be not less than 0.65.

11. A method of cooling an air conditioned space comprising:

(a) causing a flow of air through cooling coils of an air conditioner dehumidifier, (b) determining at least one of air flow velocity and air volume flow rate, (c) sensing dry bulb temperature in said conditioned space and globe thermometer temperature in at least one part of said conditioned space when air and globe temperatures differ therein, (d) sensing ambient air temperature,
(e) providing an electronic controller with input data from (b), (c) and (d) hereof,
(f) computing with said controller air supply volume and operative temperature and comparing relative air velocity over occupants and said computed operative temperature with a comfort target zone for humans depicting combinations of relative air velocity and operative temperature which have been determined by solution of the thermal energy balance equation which includes heat transfer resistance of ooccupants' clothing and level of physical activity, and the convective, radiative and evaporative exchanges of energy between the occupants and their surroundings,
(g) adjusting at least one of air supply to said space and supply air temperature to retain said space within said narrow target zone.

12. A method of controlling an air conditioning system, comprising receiving information defining occupant activity, and including:
(a) supply and return air dry bulb temperature,
(b) at least one of globe temperature and operative temperature,
(c) at least one of a measure and estimate of relative humidity,
(d) at least one of supply air volume flow rate and air velocity and available air flow area and a pressure difference,
(e) time of day and day of year and date defining:
(f) the most probable range of clothing worn by occupants of the conditioned space for representative seasonal and ambient conditions,
(g) the range of insulation values of clothing types,
(h) the metabolic energy release rate and the external work done for a representative range of activities,
and selecting appropriate values of metabolic energy release rate, external work output and clothing insulation, computing, from a balance between net metabolic heat generation by the occupant and the rate at which it is exchanged with the surroundings within said conditioned space, the change in dry bulb air temperature and relative humidity in said conditioned space necessary to make said rate of heat exchange with the surroundings equal to said net metabolic heat generation by the occupant within a small tolerance range defined by reference to the statistical results of studies of human responses to thermal environments, and
initiating action to change said air temperature and relative humidity by changing at least one of supply air flow rate and active size of dehumidifier, coolant flow rate, and supply air temperature to maintain the conditioned space within said tolerance range.

13. A method according to claim 12 further comprising calculating the change in sensible heat load in the conditioned space due to the changes in the transmitted heat load and changes in the rates of heat removed from equipment and occupants within said space consequent upon said changes in temperature and relative humidity within said space and employing said calculations in determining the optimum strategy by which said changes are effected.

14. A method according to claim 13 further effecting change in relative air velocity to maintain the conditioned space within said tolerance band.

15. A method according to claim 13 further comprising recording both said interrogated and computed data.

16. A method according to claim 13 wherein said computed balance between net metabolic heat generation by the occupant and the rate at which it is exchanged with the surroundings within said conditioned space is computed from the equation derived by P. O. Fanger and known as the comfort equation and published in the ASHRAE Fundamentals Handbook, 1989, and said tolerance in said balance is evaluated from the condition that the quantity known as the Predicted Mean Vote and published in said ASHRAE handbook shall not be less than $-0.5$ or greater than $+0.5$.

17. An air conditioner according to claim 13 wherein said electronic controller is programmed to reduce the velocity of air flow through a face of a dehumidifier to not more than 0.5 meters per second and to cause coolant to flow through the tubes of at least part of said dehumidifier at a velocity of not less than 1.0 meters per second and not more than 2.2 meters per second for at least part of a period during which said conditioned space is not occupied, such procedure allowing the humidity ratio of the air to reduce to a minimum value without inhibition and thus to dry all deposits of water from the air distribution system and to reduce the moisture content of the building fabric and furnishings within said conditioned space.

18. An air conditioner for cooling a conditioned space within a relatively narrow comfort target zone as depicted on a psychrometric type chart, itself generally within a relatively broad standard comfort zone, the factors determining said target zone including the heat transfer resistance of occupants'0 clothing and level of physical activity, comprising:
a dehumidifier having a plurality of coil portions, a fan located to propel air flow through said coil portions,
temperature sensing means comprising a thermometer arranged to ascertain at least one of mean radiant temperature and operative temperature in said conditioned space,
humidity sensing means in said conditioned space, and:
(a) air control means controlling relative air velocity within occupied regions of said space to lie between 0.05 and 0.30 meters per second, but said air not to exceed a velocity of three meters per second through a face of an air conditioner dehumidifier,
(b) temperature control means controlling the temperature of supply air to said space, and dry bulb air temperature within said space,
(c) coolant control valve means controlling effective size of said dehumidifier while maintaining coolant velocity through said dehumidifier to between the equivalent of 1 and 2.2 meters per second, and
(d) humidity control means coupled to said humidity sensor and to at least one of said temperature control means and coolant control valves to control humidity ratio in said conditioned space to be between four and thirteen grams of water vapour per kilogram of dry air by varying at least one of leaving temperature of the supply air from, effective size of, and coolant flow velocity said dehumidifier when said humidity ratio approaches said four grams per kilogram.

19. An air conditioner according to claim 18 wherein said temperature sensing means comprise dry bulb thermometers in supply air to and return air from said conditioned space, and further comprising air flow rate sensing means, ambient air temperature sensing means, and an electronic controller interconnecting said sensing means and control means to effect control of said relative air velocity, dry bulb temperature in said space, supply air temperature, effective dehumidifier size and minimum and maximum humidity in said space.

20. An air conditioner according to claim 19 wherein said air control means comprises dampers located between said dehumidifier and said conditioned space, and motors coupled to said dampers to control air flow therethrough, and said electronic controller limits relative air velocity to between 0.05 and 0.30 meters per second through the conditioned space.

21. An air conditioner according to claim 19 wherein said temperature control means comprises said coolant control valve means and said electronic controller varies the number of active coil portions of said dehumidifier to retain coolant velocity through said active coils between 1 and 2.2 meters per second.

22. An air conditioner according to claim 19 wherein said controller increases the leaving temperature of the supply air when the humidity ratio drops to four grams of water vapour per kilogram of dry air.

23. An air conditioner according to claim 19 wherein said air control means comprises fan speed control means effected through communication between said air flow control means and said electronic control means.

24. An air conditioner according to claim 18 wherein said control means are components of an air handling unit, and said air conditioned space comprises a plurality of separate zones, comprising further said sensing means in each of at least some of said zones, and communication means between said further sensing means and said air handling unit.

25. An air conditioner according to claim 19 wherein the fan and air control means co-operate to deliver ventilation air to said conditioned space at the rate of not less than 7.5 liters of ventilation air per person said ventilation air being that portion f the supply air drawn from outside the building and mixed with recirculated air prior to its passing through the dehumidifier.

* * * * *